United States Patent
Kida et al.

(10) Patent No.: US 11,784,990 B2
(45) Date of Patent: Oct. 10, 2023

(54) PROTECTING DATA TRANSFER BETWEEN A SECURE APPLICATION AND NETWORKED DEVICES

(71) Applicant: Intel Corporation, Santa Clara, CA (US)

(72) Inventors: Luis Kida, Beaverton, OR (US); Reshma Lal, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 61 days.

(21) Appl. No.: 17/549,014

(22) Filed: Dec. 13, 2021

(65) Prior Publication Data

US 2022/0103536 A1 Mar. 31, 2022

(51) Int. Cl.
H04L 29/06 (2006.01)
H04L 9/40 (2022.01)
(Continued)

(52) U.S. Cl.
CPC ........ *H04L 63/0485* (2013.01); *G06F 9/5044* (2013.01); *G06F 9/5083* (2013.01);
(Continued)

(58) Field of Classification Search
CPC ... H04L 63/0485; H04L 9/0825; H04L 9/085; H04L 9/3242; H04L 63/0435;
(Continued)

(56) References Cited

U.S. PATENT DOCUMENTS

2014/0258438 A1\* 9/2014 Ayoub .................... G06F 13/28
709/212
2016/0248809 A1 8/2016 Smith et al.
(Continued)

FOREIGN PATENT DOCUMENTS

WO 2019036073 A1 2/2019
WO WO-2020000401 A1 \* 1/2020 ......... G06F 12/1408

OTHER PUBLICATIONS

International Patent Application No. PCT/US2022/077546 "International Search Report and Written Opinion" dated Jan. 31, 2023, 10 pages.

*Primary Examiner* — Yogesh Paliwal
(74) *Attorney, Agent, or Firm* — Jaffery Watson; MENDONSA & HAMILTON LLP

(57) ABSTRACT

An apparatus to facilitate protecting data transfer between a secure application and networked devices is disclosed. The apparatus includes a source network interface controller (NIC); and a processor to provide a trusted execution environment (TEE) to run an application, wherein the source NIC operates outside of a trust boundary of the TEE, and wherein the processor is to utilize the application in the TEE to: generate encrypted data of the application; copy the encrypted data to a local shared buffer; interface with the source NIC to initiate a copy, over a network, of the encrypted data from the local shared buffer to a remote buffer of a remote platform; and communicate at least one message with the remote platform to indicate that the encrypted data is available and to enable the remote platform to verify integrity of the encrypted data, wherein the one least one message comprises an authentication tag.

20 Claims, 24 Drawing Sheets

(51) Int. Cl.
*G06F 13/28* (2006.01)
*H04L 9/08* (2006.01)
*G06F 9/50* (2006.01)
*H04L 9/32* (2006.01)

(52) U.S. Cl.
CPC ............. *G06F 13/28* (2013.01); *H04L 9/085* (2013.01); *H04L 9/0825* (2013.01); *H04L 9/3242* (2013.01); *H04L 63/0435* (2013.01); *H04L 63/061* (2013.01); *H04L 63/123* (2013.01)

(58) Field of Classification Search
CPC ... H04L 63/061; H04L 63/123; G06F 9/5044; G06F 9/5083; G06F 13/28; G06F 3/0656
See application file for complete search history.

(56) References Cited

U.S. PATENT DOCUMENTS

| | | | |
|---|---|---|---|
| 2020/0220713 A1* | 7/2020 | Li | H04L 9/14 |
| 2020/0242258 A1* | 7/2020 | Smith | H04L 9/0894 |
| 2021/0029170 A1 | 1/2021 | Gupta et al. | |
| 2021/0117246 A1 | 4/2021 | Lal et al. | |
| 2022/0103349 A1* | 3/2022 | Tsirkin | G06F 21/53 |

* cited by examiner

1700

Establish, by an application running on an application server, an integrity-protected channel with a remote acceleration server via an attestation and key exchange protocol, where the key exchange protocol to cause a shared secret key to be derived with the remote acceleration server
1710

↓

Create, in host shared memory of the application server, a buffer including encrypted and integrity-protect data generated by an application executing in a trusted execution environment (TEE), where the data is encrypted using the shared secret key and integrity protected using an authentication tag
1720

↓

Cause, by an untrusted network interface card (NIC) of the application server, a copy of the local shared buffer to a remote buffer of the remote acceleration server, wherein the untrusted NIC manages the buffer copy process
1730

↓

Send, by the application, a message to the remote accelerator server to inform the remote acceleration server that the encrypted and integrity-protected data is available in the remote buffer, where the message includes the authentication tag that is generated over the message payload using the shared secret key
1740

Establish, by an application running on an application server, an integrity-protected channel with a remote acceleration server via an attestation and key exchange protocol, where the key exchange protocol to cause a shared secret key to be derived with the remote acceleration server
1810

↓

Create, by an application in a trusted execution environment (TEE), a buffer in host shared memory of the application server, the buffer including encrypted and integrity-protect data, where the data is encrypted using the shared secret key and integrity protected using an authentication tag
1820

↓

Send, by the application, a message to the remote accelerator server to request the remote acceleration server to initiate a network transfer through a remote network interface card (NIC) of the remote acceleration server, where the message includes the authentication tag that is generated over the encrypted data using the shared secret key
1830

↓

Receive, by an untrusted network interface card (NIC) of the application server from the remote NIC, a request to read the encrypted and integrity-protected data from the local shared buffer
1840

↓

Return, in response to the request by the untrusted NIC, the encrypted and integrity-protected data from the local shared buffer to the remote NIC, where the remote acceleration server decrypts the data and uses the authentication tag to verify integrity of the data
1850

Establish, by an application running on an application server, an integrity-protected channel with a remote acceleration server via an attestation and key exchange protocol, where the key exchange protocol to cause a shared secret key to be derived with the remote acceleration server
1910

Send, via the application in the TEE to a remote device of the remote acceleration server, a first message requesting data transfer of data of the remote device to the application, wherein the first message includes a message authentication tag to verify integrity
1920

Receive, at an untrusted network interface card (NIC) of the application server, encrypted data from a remote NIC of the remote acceleration server, the encrypted data comprises the data of the remote device encrypted with the shared secret key and integrity-protected using the authentication tag for the first message
1930

Write, by the untrusted NIC, the encrypted data to a buffer of shared memory in the application server
1940

Receive, by the application in the TEE, a second message indicating that the data has been copied to the application server, where the second message includes a data authentication tag
1950

Decrypt, by the application in the TEE, the encrypted data from the buffer using the shared secret key
1960

Verify, by the application in the TEE, the integrity of the decrypted data using the data authentication tag
1970

*FIG. 19*

PROTECTING DATA TRANSFER BETWEEN A SECURE APPLICATION AND NETWORKED DEVICES

FIELD

This description relates generally to data processing and more particularly to protecting data transfer between a secure application and networked devices.

BACKGROUND

Disaggregated computing is on the rise in data centers. Cloud service providers (CSP) are deploying solutions where processing of a workload is distributed on disaggregated compute resources, such as CPUs, GPUs, and hardware accelerators (including field programmable gate arrays (FPGAs)), that are connected via a network instead of being on the same platform and connected via physical links such as peripheral component interconnect express (PCIe). Disaggregated computing enables improved resource utilization and lowers ownership costs by enabling more efficient use of available resources. Disaggregated computing also enables pooling a large number of hardware accelerators for large computation making the computation more efficient and better performing.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate typical embodiments and are therefore not to be considered limiting of its scope.

FIG. 17 is a flow diagram illustrating a method for protecting data transfer from a secure application to networked devices initiated by a NIC in an application server of the secure application, in accordance with implementations herein.

FIG. 18 is a flow diagram illustrating a method for protecting data transfer from a secure application to networked devices initiated by a NIC in a remote acceleration server of the networked devices, in accordance with implementations herein.

FIG. 19 is a flow diagram illustrating a method for protecting data transfer from a networked trusted device to a secure application, in accordance with implementations herein.

DETAILED DESCRIPTION

Figure 1:
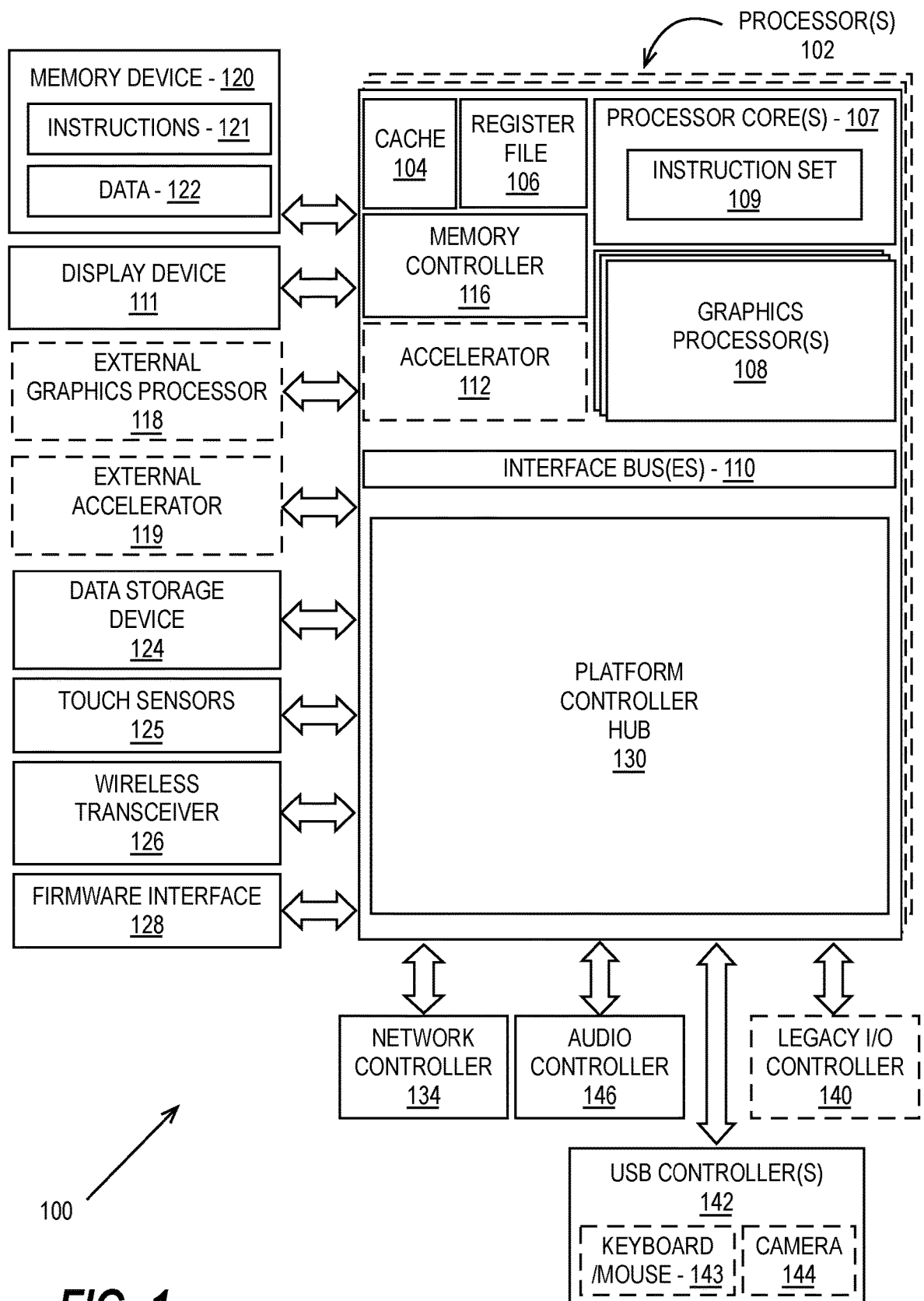
FIG. 1 is a block diagram of a processing system, according to an embodiment.

Disaggregated computing is on the rise in data centers. Cloud service providers (CSP) are deploying solutions where processing of a workload is distributed on disaggregated compute resources, such as central processing units (CPUs), graphics processing units (GPUs), field programmable gate arrays (FPGAs), application-specific integrated circuits (ASICs), and other hardware accelerators, that are connected via a network instead of being on the same platform and connected via physical links such as peripheral component interconnect express (PCIe). Disaggregated computing enables improved resource utilization and lowers ownership costs by enabling more efficient use of available resources. Disaggregated computing also enables pooling a large number of computation resources for large computational problems, making the computation more efficient and better performing.

In the following description, numerous specific details are set forth to provide a more thorough understanding. However, it may be apparent to one of skill in the art that the embodiments described herein may be practiced without one or more of these specific details. In other instances, well-known features have not been described to avoid obscuring the details of the present embodiments.

Various embodiments are directed to techniques for disaggregated computing for a distributed confidential computing environment, for instance.

System Overview

While the concepts of the description herein are susceptible to various modifications and alternative forms, specific embodiments thereof have been shown by way of example in the drawings and will be described herein in detail. It should be understood, however, that there is no intent to limit the concepts of description to the particular forms disclosed, but on the contrary, the intention is to cover all modifications, equivalents, and alternatives consistent with the description and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be utilized. Rather, in some embodiments, such features may be arranged in a different manner and/or order than shown in the illustrative figures. Additionally, the inclusion of a structural or method feature in a particular figure is not meant to imply that such feature is utilized in all embodiments and, in some embodiments, may not be included or may be combined with other features.

Referring now to FIG. 1, a block diagram of a processing system 100, according to an embodiment. System 100 may be used in a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, system 100 can include, couple with, or be integrated within: a server-based gaming platform; a game console, including a game and media console; a mobile gaming console, a handheld game console, or an online game console. In some embodiments the system 100 is part of a mobile phone, smart phone, tablet computing device or mobile Internet-connected device such as a laptop with low internal storage capacity. Processing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 100 includes or is part of a television or set top box device. In one embodiment, system 100 can include, couple with, or be integrated within a self-driving vehicle such as a bus, tractor trailer, car, motor or electric power cycle, plane or glider (or any combination thereof). The self-driving vehicle may use system 100 to process the environment sensed around the vehicle.

In some embodiments, the one or more processors 102 each include one or more processor cores 107 to process instructions which, when executed, perform operations for system or user software. In some embodiments, at least one of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). One or more processor cores 107 may process a different instruction set 109, which may include instructions to facilitate the emulation of other instruction sets. Processor core 107 may also include other processing devices, such as a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 can be additionally included in processor 102 and may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI express), memory busses, or other types of interface busses. In one embodiment the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus.

The memory device 120 can be a dynamic random-access memory (DRAM) device, a static random-access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller 116 also couples with an optional external graphics processor 118, which may communicate with the one or more graphics processors 108 in processors 102 to perform graphics and media operations. In some embodiments, graphics, media, and or compute operations may be assisted by an accelerator 112 which is a coprocessor that can be configured to perform a specialized set of graphics, media, or compute operations. For example, in one embodiment the accelerator 112 is a matrix multiplication accelerator used to optimize machine learning or compute operations. In one embodiment the accelerator 112 is a ray-tracing accelerator that can be used to perform ray-tracing operations in concert with the graphics processor 108. In one embodiment, an external accelerator 119 may be used in place of or in concert with the accelerator 112.

In one embodiment, the accelerator 112 is a field programmable gate array (FPGA). An FPGA refers to an integrated circuit (IC) including an array of programmable logic blocks that can be configured to perform simple logic gates and/or complex combinatorial functions, and may also include memory elements. FPGAs are designed to be configured by a customer or a designer after manufacturing. FPGAs can be used to accelerate parts of an algorithm, sharing part of the computation between the FPGA and a general-purpose processor. In some embodiments, accelerator 112 is a GPU or an application-specific integrated circuit (ASIC). In some implementations, accelerator 112 is also referred to as a compute accelerator or a hardware accelerator.

In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., non-volatile memory, volatile memory, hard disk drive, flash memory, NAND, 3D NAND, 3D XPoint, etc.). The data storage device 124 can connect via a storage interface (e.g., SATA) or via a peripheral bus, such as a Peripheral Component Interconnect bus (e.g., PCI, PCI express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, 5G, or Long-Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It may be appreciated that the system 100 shown is one example and not limiting, as other types of data processing systems that are differently configured may also be used. For example, an instance of the memory controller 116 and platform controller hub 130 may be integrated into a discreet external graphics processor, such as the external graphics processor 118. In one embodiment the platform controller hub 130 and/or memory controller 116 may be external to the one or more processor(s) 102. For example, the system 100 can include an external memory controller 116 and platform controller hub 130, which may be configured as a memory controller hub and peripheral controller hub within a system chipset that is in communication with the processor(s) 102.

For example, circuit boards ("sleds") can be used on which components such as CPUs, memory, and other components are placed are designed for increased thermal performance. In some examples, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center may, in use, pool resources, such as memory, accelerators (e.g., graphics processing unit (GPUs), graphics accelerators, FPGAs, ASICs, neural network and/or artificial intelligence accelerators, etc.), and data storage drives that are physically disaggregated, and provide them to compute resources (e.g., processors), enabling the compute resources to access the pooled resources as if they were local.

A power supply or source can provide voltage and/or current to system 100 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

Figure 2:
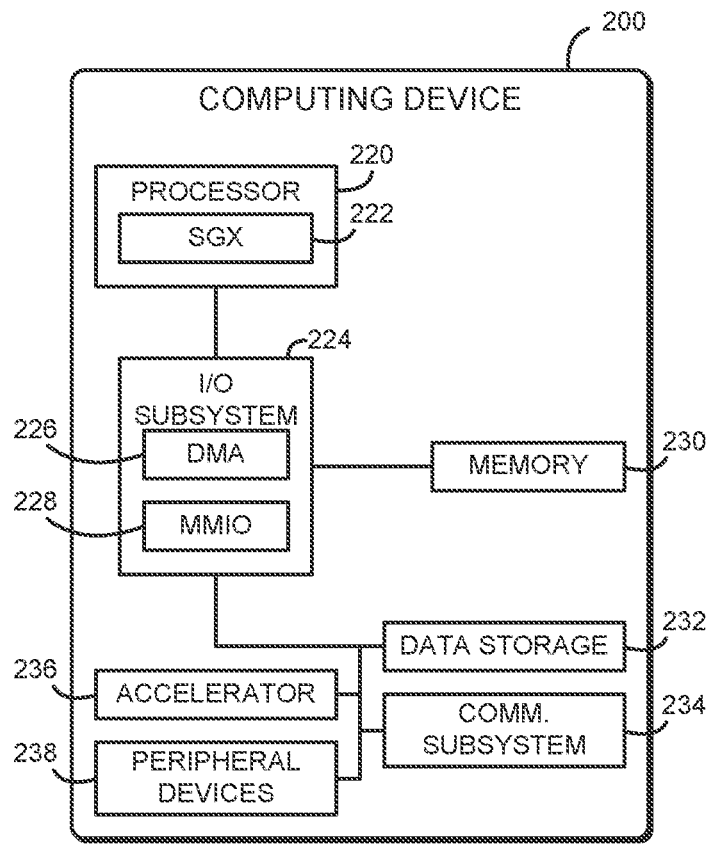
FIG. 2 is a simplified block diagram of at least one embodiment of a computing device for secure I/O with an accelerator device.

FIG. 2 illustrates a block diagrams of an additional processing system architecture provided by embodiments described herein. A computing device 200 for secure I/O with an accelerator device includes a processor 220 and an accelerator device 236, such as a field-programmable gate array (FPGA). In use, as described further below, a trusted execution environment (TEE) established by the processor 220 securely communicates data with the accelerator 236. Data may be transferred using memory-mapped I/O (MMIO) transactions or direct memory access (DMA) transactions. For example, the TEE may perform an MMIO write transaction that includes encrypted data, and the accelerator 236 decrypts the data and performs the write. As another example, the TEE may perform an MMIO read request transaction, and the accelerator 236 may read the requested data, encrypt the data, and perform an MMIO read response transaction that includes the encrypted data. As yet another example, the TEE may configure the accelerator 236 to perform a DMA operation, and the accelerator 236 performs a memory transfer, performs a cryptographic operation (i.e., encryption or decryption), and forwards the result. As described further below, the TEE and the accelerator 236 generate authentication tags (ATs) for the transferred data and may use those ATs to validate the transactions. The computing device 200 may thus keep untrusted software of the computing device 200, such as the operating system or virtual machine monitor, outside of the trusted code base (TCB) of the TEE and the accelerator 236. Thus, the computing device 200 may secure data exchanged or otherwise processed by a TEE and an accelerator 236 from an owner of the computing device 200 (e.g., a cloud service provider) or other tenants of the computing device 200. Accordingly, the computing device 200 may improve security and performance for multi-tenant environments by allowing secure use of accelerator devices.

The computing device 200 may be embodied as any type of device capable of performing the functions described herein. For example, the computing device 200 may be embodied as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 2, the illustrative computing device 200 includes a processor 220, an I/O subsystem 224, a memory 230, and a data storage device 232. Additionally, in some embodiments, one or more of the illustrative components may be incorporated in, or otherwise form a portion of, another component. For example, the memory 230, or portions thereof, may be incorporated in the processor 220 in some embodiments.

The processor 220 may be embodied as any type of processor capable of performing the functions described herein. For example, the processor 220 may be embodied as a single or multi-core processor(s), digital signal processor, microcontroller, or other processor or processing/controlling circuit. As shown, the processor 220 illustratively includes secure enclave support 222, which allows the processor 220 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 220 while being executed or while being stored in certain protected cache memory of the processor 220. The code and data included in the secure enclave may be encrypted when stored in a shared cache or the main memory 230. The secure enclave support 222 may be embodied as a set of processor instruction extensions that allows the processor 220 to establish one or more secure enclaves in the memory 230. For example, the secure enclave support 222 may be embodied as Intel® Software Guard Extensions (SGX) technology.

The memory 230 may be embodied as any type of volatile or non-volatile memory or data storage capable of performing the functions described herein. In operation, the memory 230 may store various data and software used during operation of the computing device 200 such as operating systems, applications, programs, libraries, and drivers. As shown, the memory 230 may be communicatively coupled to the processor 220 via the I/O subsystem 224, which may be embodied as circuitry and/or components to facilitate input/output operations with the processor 220, the memory 230, and other components of the computing device 200. For example, the I/O subsystem 224 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 230 may be directly coupled to the processor 220, for example via an integrated memory controller hub. Additionally, in some embodiments, the I/O subsystem 224 may form a portion of a system-on-a-chip (SoC) and be incorporated, along with the processor 220, the memory 230, the accelerator device 236, and/or other components of the computing device 200, on a single integrated circuit chip. Additionally, or alternatively, in some embodiments the processor 220 may include an integrated memory controller and a system agent, which may be embodied as a logic block in which data traffic from processor cores and I/O devices converges before being sent to the memory 230.

As shown, the I/O subsystem 224 includes a direct memory access (DMA) engine 226 and a memory-mapped I/O (MMIO) engine 228. The processor 220, including secure enclaves established with the secure enclave support 222, may communicate with the accelerator device 236 with one or more DMA transactions using the DMA engine 226 and/or with one or more MMIO transactions using the MMIO engine 228. The computing device 200 may include multiple DMA engines 226 and/or MMIO engines 228 for handling DMA and MMIO read/write transactions based on bandwidth between the processor 220 and the accelerator 236. Although illustrated as being included in the I/O subsystem 224, it should be understood that in some embodiments the DMA engine 226 and/or the MMIO engine 228 may be included in other components of the computing device 200 (e.g., the processor 220, memory controller, or system agent), or in some embodiments may be embodied as separate components.

The data storage device 232 may be embodied as any type of device or devices configured for short-term or long-term storage of data such as, for example, memory devices and circuits, memory cards, hard disk drives, solid-state drives, non-volatile flash memory, or other data storage devices. The computing device 200 may also include a communications subsystem 234, which may be embodied as any communication circuit, device, or collection thereof, capable of enabling communications between the computing device 200 and other remote devices over a computer network (not shown). The communications subsystem 234 may be configured to use any one or more communication technology (e.g., wired or wireless communications) and associated protocols (e.g., Ethernet, Bluetooth®, WiMAX, 3G, 4G LTE, etc.) to effect such communication.

The accelerator device 236 may be embodied as a field-programmable gate array (FPGA), an application-specific integrated circuit (ASIC), a coprocessor, or other digital logic device capable of performing accelerated functions (e.g., accelerated application functions, accelerated network functions, or other accelerated functions). Illustratively, the accelerator device 236 is an FPGA, which may be embodied as an integrated circuit including programmable digital logic resources that may be configured after manufacture. The FPGA may include, for example, a configurable array of logic blocks in communication over a configurable data interchange. The accelerator device 236 may be coupled to the processor 220 via a high-speed connection interface such as a peripheral bus (e.g., a PCI Express bus) or an inter-processor interconnect (e.g., an in-die interconnect (IDI) or QuickPath Interconnect (QPI)), or via any other appropriate interconnect. The accelerator device 236 may receive data and/or commands for processing from the processor 220 and return results data to the processor 220 via DMA, MMIO, or other data transfer transactions.

As shown, the computing device 200 may further include one or more peripheral devices 238. The peripheral devices 238 may include any number of additional input/output devices, interface devices, hardware accelerators, and/or other peripheral devices. For example, in some embodiments, the peripheral devices 238 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

Field Programmable Gate Arrays (FPGAs)

Figure 3:
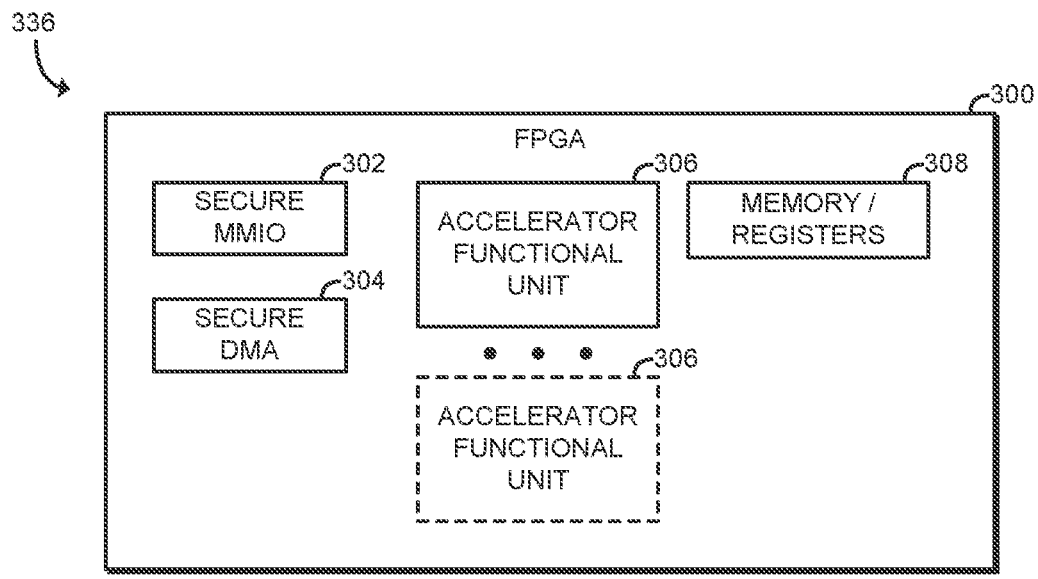
FIG. 3 is a simplified block diagram of at least one embodiment of an accelerator device of the computing device of FIG. 2.

Referring now to FIG. 3, an illustrative embodiment of a field-programmable gate array (FPGA) 300 is shown. As shown, the FPGA 300 is one potential embodiment of an accelerator device 236 described with respect to FIG. 2. The illustratively FPGA 300 includes a secure MMIO engine 302, a secure DMA engine 304, one or more accelerator functional units (AFUs) 306, and memory/registers 308. As described further below, the secure MMIO engine 302 and the secure DMA engine 304 perform in-line authenticated cryptographic operations on data transferred between the processor 220 (e.g., a secure enclave established by the processor) and the FPGA 300 (e.g., one or more AFUs 306). In some embodiments, the secure MMIO engine 302 and/or the secure DMA engine 304 may intercept, filter, or otherwise process data traffic on one or more cache-coherent interconnects, internal buses, or other interconnects of the FPGA 300.

Each AFU 306 may be embodied as logic resources of the FPGA 300 that are configured to perform an acceleration task. Each AFU 306 may be associated with an application executed by the processing system 100 in a secure enclave or other trusted execution environment. Each AFU 306 may be configured or otherwise supplied by a tenant or other user of the processing system 100. For example, each AFU 306 may correspond to a bitstream image programmed to the FPGA 300. As described further below, data processed by each AFU 306, including data exchanged with the trusted execution environment, may be cryptographically protected from untrusted components of the processing system 100 (e.g., protected from software outside of the trusted code base of the tenant enclave). Each AFU 306 may access or otherwise process stored in the memory/registers 308, which may be embodied as internal registers, cache, SRAM, storage, or other memory of the FPGA 300. In some embodiments, the memory 308 may also include external DRAM or other dedicated memory coupled to the FPGA 300.

Computing Systems and Graphics Processors

FIGS. 4A-4D illustrate computing systems and graphics processors provided by embodiments described herein. The elements of FIGS. 4A-4D having the same reference numbers (or names) as the elements of any other figure herein can operate or function in any manner similar to that described elsewhere herein, but are not limited to such.

In some implementations, a GPU is communicatively coupled to host/processor cores to accelerate, for example, graphics operations, machine-learning operations, pattern analysis operations, and/or various general-purpose GPU (GPGPU) functions. The GPU may be communicatively coupled to the host processor/cores over a bus or another interconnect (e.g., a high-speed interconnect such as PCIe or NVLink). Alternatively, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

Figure 4A:
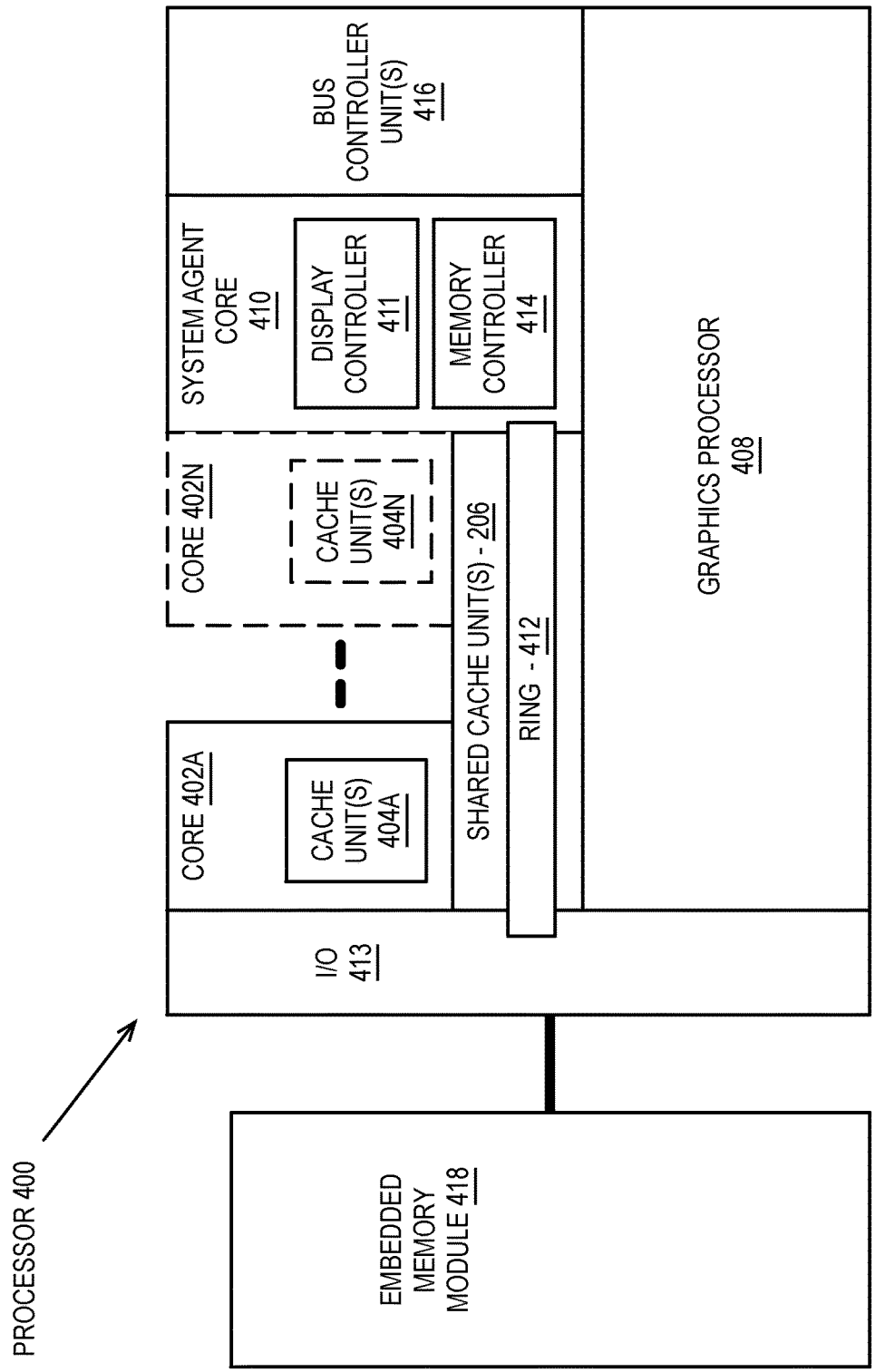
FIGS. 4A-4D illustrate computing systems and graphics processors provided by embodiments described herein.

FIG. 4A is a block diagram of an embodiment of a processor 400 having one or more processor cores 402A-402N, an integrated memory controller 414, and an integrated graphics processor 408. Processor 400 can include additional cores up to and including additional core 402N represented by the dashed lined boxes. Each of processor cores 402A-402N includes one or more internal cache units 404A-404N. In some embodiments each processor core also has access to one or more shared cached units 406. The internal cache units 404A-404N and shared cache units 406 represent a cache memory hierarchy within the processor 400. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 406 and 404A-404N.

In some embodiments, processor 400 may also include a set of one or more bus controller units 416 and a system agent core 410. The one or more bus controller units 416 manage a set of peripheral buses, such as one or more PCI or PCI express busses. System agent core 410 provides management functionality for the various processor components. In some embodiments, system agent core 410 includes one or more integrated memory controllers 414 to manage access to various external memory devices (not shown).

In some embodiments, one or more of the processor cores 402A-402N include support for simultaneous multi-threading. In such embodiment, the system agent core 410 includes components for coordinating and operating cores 402A-402N during multi-threaded processing. System agent core 410 may additionally include a power control unit (PCU), which includes logic and components to regulate the power state of processor cores 402A-402N and graphics processor 408.

In some embodiments, processor 400 additionally includes graphics processor 408 to execute graphics processing operations. In some embodiments, the graphics processor 408 couples with the set of shared cache units 406, and the system agent core 410, including the one or more integrated memory controllers 414. In some embodiments, the system agent core 410 also includes a display controller 411 to drive graphics processor output to one or more coupled displays. In some embodiments, display controller 411 may also be a separate module coupled with the graphics processor via at least one interconnect, or may be integrated within the graphics processor 408.

In some embodiments, a ring-based interconnect unit 412 is used to couple the internal components of the processor 400. However, an alternative interconnect unit may be used, such as a point-to-point interconnect, a switched interconnect, or other techniques, including techniques well known in the art. In some embodiments, graphics processor 408 couples with the ring interconnect 412 via an I/O link 413.

The example I/O link 413 represents at least one of multiple varieties of I/O interconnects, including an on package I/O interconnect which facilitates communication between various processor components and a high-performance embedded memory module 418, such as an eDRAM module. In some embodiments, each of the processor cores 402A-402N and graphics processor 408 can use embedded memory modules 418 as a shared Last Level Cache.

In some embodiments, processor cores 402A-402N are homogenous cores executing the same instruction set architecture. In another embodiment, processor cores 402A-402N are heterogeneous in terms of instruction set architecture (ISA), where one or more of processor cores 402A-402N execute a first instruction set, while at least one of the other cores executes a subset of the first instruction set or a different instruction set. In one embodiment, processor cores 402A-402N are heterogeneous in terms of microarchitecture, where one or more cores having a relatively higher power consumption couple with one or more power cores having a lower power consumption. In one embodiment, processor cores 402A-402N are heterogeneous in terms of computational capability. Additionally, processor 400 can be implemented on one or more chips or as an SoC integrated circuit having the illustrated components, in addition to other components.

Figure 4B:
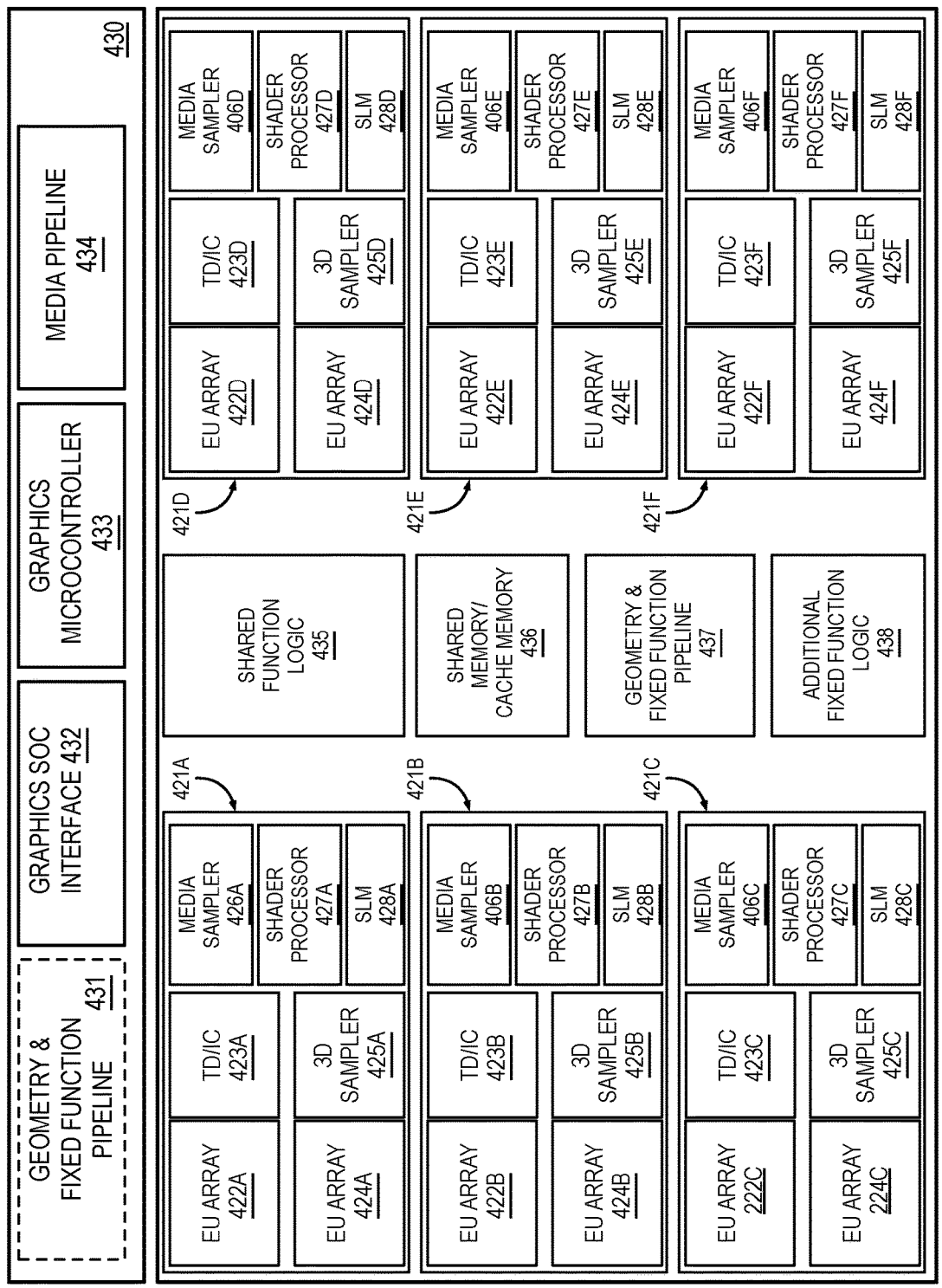

FIG. 4B is a block diagram of hardware logic of a graphics processor core 419, according to some embodiments described herein. Elements of FIG. 4B having the same reference numbers (or names) as the elements of any other figure herein can operate or function in any manner similar to that described elsewhere herein, but are not limited to such. The graphics processor core 419, sometimes referred to as a core slice, can be one or multiple graphics cores within a modular graphics processor. The graphics processor core 419 is an example of one graphics core slice, and a graphics processor as described herein may include multiple graphics core slices based on target power and performance envelopes. Each graphics processor core 419 can include a fixed function block 430 coupled with multiple sub-cores 421A-421F, also referred to as sub-slices, that include modular blocks of general-purpose and fixed function logic.

In some embodiments, the fixed function block 430 includes a geometry/fixed function pipeline 431 that can be shared by all sub-cores in the graphics processor core 419, for example, in lower performance and/or lower power graphics processor implementations. In various embodiments, the geometry/fixed function pipeline 431 includes a 3D fixed function, a video front-end unit, a thread spawner and thread dispatcher, and a unified return buffer manager, which manages unified return buffers.

In one embodiment the fixed function block 430 also includes a graphics SoC interface 432, a graphics microcontroller 433, and a media pipeline 434. The graphics SoC interface 432 provides an interface between the graphics processor core 419 and other processor cores within a system on a chip integrated circuit. The graphics microcontroller 433 is a programmable sub-processor that is configurable to manage various functions of the graphics processor core 419, including thread dispatch, scheduling, and pre-emption. The media pipeline 434 includes logic to facilitate the decoding, encoding, pre-processing, and/or post-processing of multimedia data, including image and video data. The media pipeline 434 implement media operations via requests to compute or sampling logic within the sub-cores 421-421F.

In one embodiment the SoC interface 432 enables the graphics processor core 419 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 432 can also enable communication with fixed function devices within the SoC, such as camera imaging pipelines, and enables the use of and/or implements global memory atomics that may be shared between the graphics processor core 419 and CPUs within the SoC. The SoC interface 432 can also implement power management controls for the graphics processor core 419 and enable an interface between a clock domain of the graphic core 419 and other clock domains within the SoC. In one embodiment the SoC interface 432 enables receipt of command buffers from a command streamer and global thread dispatcher that are configured to provide commands and instructions to each of one or more graphics cores within a graphics processor. The commands and instructions can be dispatched to the media pipeline 434, when media operations are to be performed, or a geometry and fixed function pipeline (e.g., geometry and fixed function pipeline 431, geometry and fixed function pipeline 437) when graphics processing operations are to be performed.

The graphics microcontroller 433 can be configured to perform various scheduling and management tasks for the graphics processor core 419. In one embodiment the graphics microcontroller 433 can perform graphics and/or compute workload scheduling on the various graphics parallel engines within execution unit (EU) arrays 422A-422F, 424A-424F within the sub-cores 421A-421F. In this scheduling model, host software executing on a CPU core of an SoC including the graphics processor core 419 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 433 can also facilitate low-power or idle states for the graphics processor core 419, providing the graphics processor core 419 with the ability to save and restore registers within the graphics processor core 419 across low-power state transitions independently from the operating system and/or graphics driver software on the system.

The graphics processor core 419 may have greater than or fewer than the illustrated sub-cores 421A-421F, up to N modular sub-cores. For each set of N sub-cores, the graphics processor core 419 can also include shared function logic 435, shared and/or cache memory 436, a geometry/fixed function pipeline 437, as well as additional fixed function logic 438 to accelerate various graphics and compute processing operations. The shared function logic 435 can include logic units associated with the shared function logic (e.g., sampler, math, and/or inter-thread communication logic) that can be shared by each N sub-cores within the graphics processor core 419. The shared and/or cache memory 436 can be a last-level cache for the set of N sub-cores 421A-421F within the graphics processor core 419, and can also serve as shared memory that is accessible by multiple sub-cores. The geometry/fixed function pipeline 437 can be included instead of the geometry/fixed function pipeline 431 within the fixed function block 430 and can include the same or similar logic units.

In one embodiment the graphics processor core 419 includes additional fixed function logic 438 that can include various fixed function acceleration logic for use by the graphics processor core 419. In one embodiment the additional fixed function logic 438 includes an additional geometry pipeline for use in position-only shading. In position-only shading, two geometry pipelines exist, the full geometry pipeline within the geometry/fixed function pipeline 438, 431, and a cull pipeline, which is an additional geometry pipeline which may be included within the additional fixed function logic 438. In one embodiment the cull pipeline is a trimmed down version of the full geometry pipeline. The full pipeline and the cull pipeline can execute different instances of the same application, each instance having a separate context. Position-only shading can hide long cull runs of discarded triangles, enabling shading to be completed earlier in some instances. For example, and in one embodiment, the cull pipeline logic within the additional fixed function logic 438 can execute position shaders in parallel with the main application and generally generates results faster than the full pipeline, as the cull pipeline fetches and shades the position attribute of the vertices, without performing rasterization and rendering of the pixels to the frame buffer. The cull pipeline can use the generated results to compute visibility information for all the triangles without regard to whether those triangles are culled. The full pipeline (which in this instance may be referred to as a replay pipeline) can consume the visibility information to skip the culled triangles to shade the visible triangles that are finally passed to the rasterization phase.

In one embodiment the additional fixed function logic 438 can also include machine-learning acceleration logic, such as fixed function matrix multiplication logic, for implementations including optimizations for machine learning training or inferencing.

Within each graphics sub-core 421A-421F includes a set of execution resources that may be used to perform graphics, media, and compute operations in response to requests by graphics pipeline, media pipeline, or shader programs. The graphics sub-cores 421A-421F include multiple EU arrays 422A-422F, 424A-424F, thread dispatch and inter-thread communication (TD/IC) logic 423A-423F, a 3D (e.g., texture) sampler 425A-425F, a media sampler 406A-406F, a shader processor 427A-427F, and shared local memory (SLM) 428A-428F. The EU arrays 422A-422F, 424A-424F each include multiple execution units, which are general-purpose graphics processing units capable of performing floating-point and integer/fixed-point logic operations in service of a graphics, media, or compute operation, including graphics, media, or compute shader programs. The TD/IC logic 423A-423F performs local thread dispatch and thread control operations for the execution units within a sub-core and facilitate communication between threads executing on the execution units of the sub-core. The 3D sampler 425A-425F can read texture or other 3D graphics related data into memory. The 3D sampler can read texture data differently based on a configured sample state and the texture format associated with a given texture. The media sampler 406A-406F can perform similar read operations based on the type and format associated with media data. In one embodiment, each graphics sub-core 421A-421F can alternately include a unified 3D and media sampler. Threads executing on the execution units within each of the sub-cores 421A-421F can make use of shared local memory 428A-428F within each sub-core, to enable threads executing within a thread group to execute using a common pool of on-chip memory.

Figure 4C:
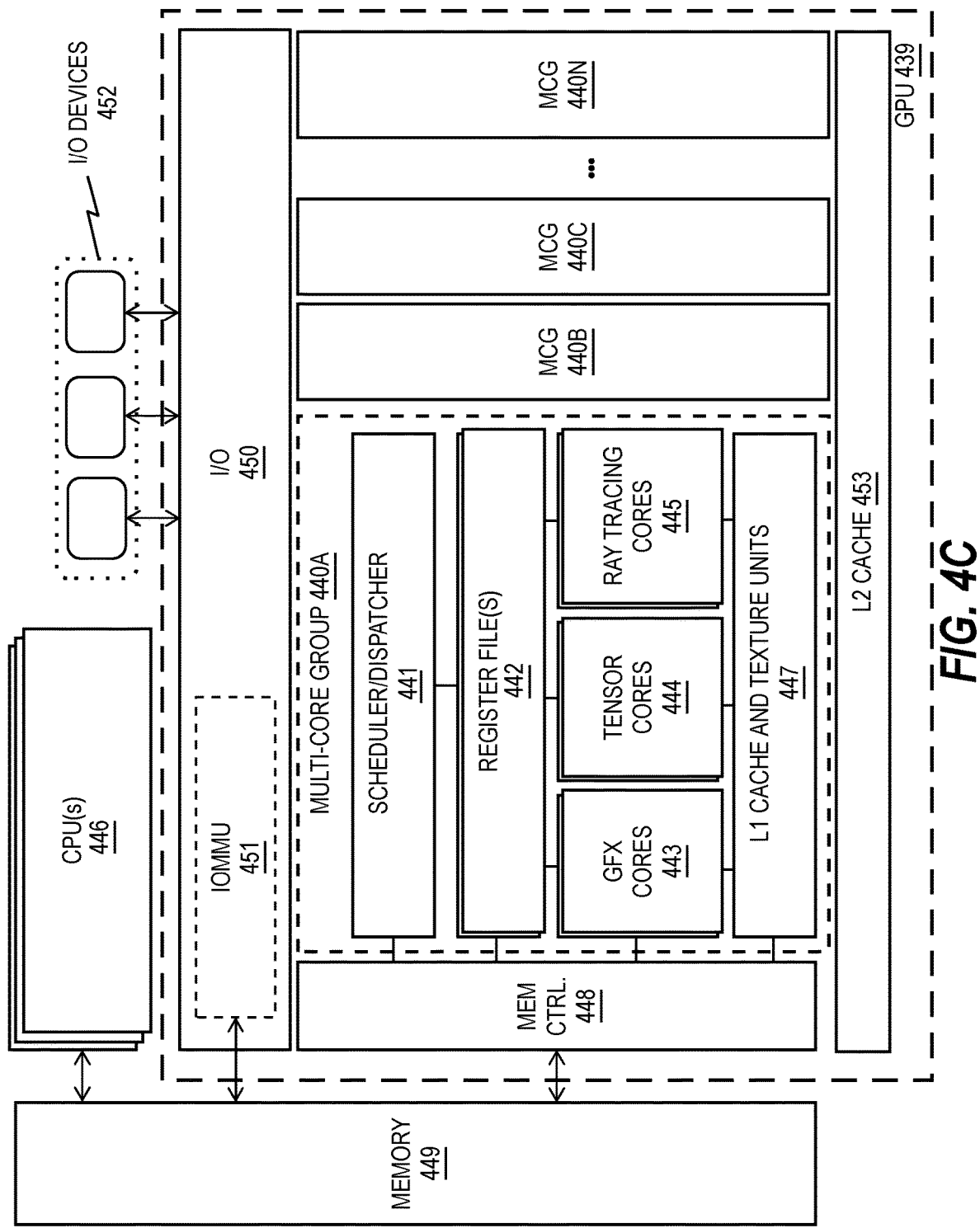

FIG. 4C illustrates a graphics processing unit (GPU) 439 that includes dedicated sets of graphics processing resources arranged into multi-core groups 440A-440N. While the details of a single multi-core group 440A are provided, it may be appreciated that the other multi-core groups 440B-440N may be equipped with the same or similar sets of graphics processing resources.

As illustrated, a multi-core group 440A may include a set of graphics cores 443, a set of tensor cores 444, and a set of ray tracing cores 445. A scheduler/dispatcher 441 schedules and dispatches the graphics threads for execution on the various cores 443, 444, 445. A set of register files 442 store operand values used by the cores 443, 444, 445 when executing the graphics threads. These may include, for example, integer registers for storing integer values, floating point registers for storing floating point values, vector registers for storing packed data elements (integer and/or floating point data elements) and tile registers for storing tensor/matrix values. In one embodiment, the tile registers are implemented as combined sets of vector registers.

One or more combined level 1 (L1) caches and shared memory units 447 store graphics data such as texture data, vertex data, pixel data, ray data, bounding volume data, etc., locally within each multi-core group 440A. One or more texture units 447 can also be used to perform texturing operations, such as texture mapping and sampling. A Level 2 (L2) cache 453 shared by all or a subset of the multi-core groups 440A-440N stores graphics data and/or instructions for multiple concurrent graphics threads. As illustrated, the L2 cache 453 may be shared across a plurality of multi-core groups 440A-440N. One or more memory controllers 448 couple the GPU 439 to a memory 449 which may be a system memory (e.g., DRAM) and/or a dedicated graphics memory (e.g., GDDR6 memory).

Input/output (I/O) circuitry 450 couples the GPU 439 to one or more I/O devices 452 such as digital signal processors (DSPs), network controllers, or user input devices. An on-chip interconnect may be used to couple the I/O devices 454 to the GPU 439 and memory 449. One or more I/O memory management units (IOMMUs) 451 of the I/O circuitry 450 couple the I/O devices 452 directly to the system memory 449. In one embodiment, the IOMMU 451 manages multiple sets of page tables to map virtual addresses to physical addresses in system memory 449. In this embodiment, the I/O devices 452, CPU(s) 446, and GPU(s) 439 may share the same virtual address space.

In one implementation, the IOMMU 451 supports virtualization. In this case, it may manage a first set of page tables to map guest/graphics virtual addresses to guest/graphics physical addresses and a second set of page tables to map the guest/graphics physical addresses to system/host physical addresses (e.g., within system memory 449). The base addresses of each of the first and second sets of page tables may be stored in control registers and swapped out on a context switch (e.g., so that the new context is provided with access to the relevant set of page tables). While not illustrated in FIG. 4C, each of the cores 443, 444, 445 and/or multi-core groups 440A-440N may include translation lookaside buffers (TLBs) to cache guest virtual to guest physical translations, guest physical to host physical translations, and guest virtual to host physical translations.

In one embodiment, the CPUs 446, GPUs 439, and I/O devices 452 are integrated on a single semiconductor chip and/or chip package. The illustrated memory 449 may be integrated on the same chip or may be coupled to the memory controllers 448 via an off-chip interface. In one implementation, the memory 449 comprises GDDR6 memory which shares the same virtual address space as other physical system-level memories, although the underlying principles of implementations herein are not limited to this specific implementation.

In one embodiment, the tensor cores 444 include a plurality of execution units specifically designed to perform matrix operations, which are the compute operations used to perform deep learning operations. For example, simultaneous matrix multiplication operations may be used for neural network training and inferencing. The tensor cores 444 may perform matrix processing using a variety of operand precisions including single precision floating-point (e.g., 32 bits), half-precision floating point (e.g., 16 bits), integer words (16 bits), bytes (8 bits), and half-bytes (4 bits). In one embodiment, a neural network implementation extracts features of each rendered scene, potentially combining details from multiple frames, to construct a high-quality final image.

In deep learning implementations, parallel matrix multiplication work may be scheduled for execution on the tensor cores 444. The training of neural networks, in particular, utilizes a significant number matrix dot product operations. In order to process an inner-product formulation of an N×N×N matrix multiply, the tensor cores 444 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 444 to ensure that the most efficient precision is used for different workloads (e.g., such as inferencing workloads which can tolerate quantization to bytes and half-bytes).

In one embodiment, the ray tracing cores 445 accelerate ray tracing operations for both real-time ray tracing and non-real-time ray tracing implementations. In particular, the ray tracing cores 445 include ray traversal/intersection circuitry for performing ray traversal using bounding volume hierarchies (BVHs) and identifying intersections between rays and primitives enclosed within the BVH volumes. The ray tracing cores 445 may also include circuitry for performing depth testing and culling (e.g., using a Z buffer or similar arrangement). In one implementation, the ray tracing cores 445 perform traversal and intersection operations in concert with the image denoising techniques described herein, at least a portion of which may be executed on the tensor cores 444. For example, in one embodiment, the tensor cores 444 implement a deep learning neural network to perform denoising of frames generated by the ray tracing cores 445. However, the CPU(s) 446, graphics cores 443, and/or ray tracing cores 445 may also implement all or a portion of the denoising and/or deep learning algorithms.

In addition, as described above, a distributed approach to denoising may be employed in which the GPU 439 is in a computing device coupled to other computing devices over a network or high speed interconnect. In this embodiment, the interconnected computing devices share neural network learning/training data to improve the speed with which the overall system learns to perform denoising for different types of image frames and/or different graphics applications.

In one embodiment, the ray tracing cores 445 process all BVH traversal and ray-primitive intersections, saving the graphics cores 443 from being overloaded with thousands of instructions per ray. In one embodiment, each ray tracing core 445 includes a first set of specialized circuitry for performing bounding box tests (e.g., for traversal operations) and a second set of specialized circuitry for performing the ray-triangle intersection tests (e.g., intersecting rays which have been traversed). Thus, in one embodiment, the multi-core group 440A can simply launch a ray probe, and the ray tracing cores 445 independently perform ray traversal and intersection and return hit data (e.g., a hit, no hit, multiple hits, etc.) to the thread context. The other cores 443, 444 are freed to perform other graphics or compute work while the ray tracing cores 445 perform the traversal and intersection operations.

In one embodiment, each ray tracing core 445 includes a traversal unit to perform BVH testing operations and an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 443 and tensor cores 444) are freed to perform other forms of graphics work.

In one particular embodiment described below, a hybrid rasterization/ray tracing approach is used in which work is distributed between the graphics cores 443 and ray tracing cores 445.

In one embodiment, the ray tracing cores 445 (and/or other cores 443, 444) include hardware support for a ray tracing instruction set such as Microsoft's DirectX Ray Tracing (DXR) which includes a DispatchRays command, as well as ray-generation, closest-hit, any-hit, and miss shaders, which enable the assignment of sets of shaders and textures for each object. Another ray tracing platform which may be supported by the ray tracing cores 445, graphics cores 443 and tensor cores 444 is Vulkan 1.1.85. Note, however, that the underlying principles of implementations herein are not limited to any particular ray tracing ISA.

In general, the various cores 445, 444, 443 may support a ray tracing instruction set that includes instructions/functions for ray generation, closest hit, any hit, ray-primitive intersection, per-primitive and hierarchical bounding box construction, miss, visit, and exceptions. More specifically, one embodiment includes ray tracing instructions to perform the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the children volumes a ray can traverse.

Exceptions—Includes various types of exception handlers (e.g., invoked for various error conditions).

Figure 4D:
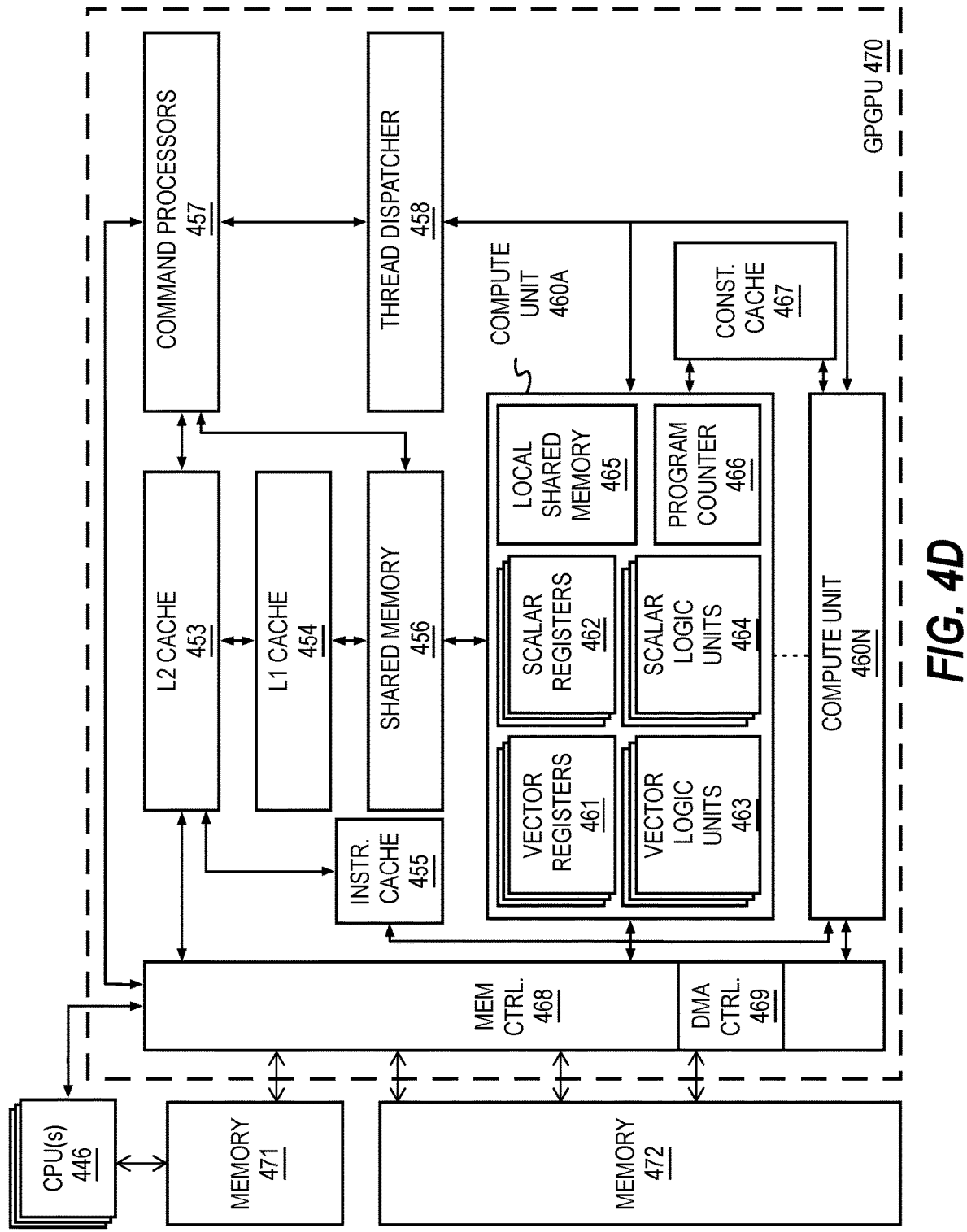

FIG. 4D is a block diagram of general purpose graphics processing unit (GPGPU) 470 that can be configured as a graphics processor and/or compute accelerator, according to embodiments described herein. The GPGPU 470 can interconnect with host processors (e.g., one or more CPU(s) 446) and memory 471, 472 via one or more system and/or memory busses. In one embodiment the memory 471 is system memory that may be shared with the one or more CPU(s) 446, while memory 472 is device memory that is dedicated to the GPGPU 470. In one embodiment, components within the GPGPU 470 and device memory 472 may be mapped into memory addresses that are accessible to the one or more CPU(s) 446. Access to memory 471 and 472 may be facilitated via a memory controller 468. In one embodiment the memory controller 468 includes an internal direct memory access (DMA) controller 469 or can include logic to perform operations that would otherwise be performed by a DMA controller.

The GPGPU 470 includes multiple cache memories, including an L2 cache 453, L1 cache 454, an instruction cache 455, and shared memory 456, at least a portion of which may also be partitioned as a cache memory. The GPGPU 470 also includes multiple compute units 460A-460N. Each compute unit 460A-460N includes a set of vector registers 461, scalar registers 462, vector logic units 463, and scalar logic units 464. The compute units 460A-460N can also include local shared memory 465 and a program counter 466. The compute units 460A-460N can couple with a constant cache 467, which can be used to store constant data, which is data that may not change during the run of kernel or shader program that executes on the GPGPU 470. In one embodiment the constant cache 467 is a scalar data cache and cached data can be fetched directly into the scalar registers 462.

During operation, the one or more CPU(s) 446 can write commands into registers or memory in the GPGPU 470 that has been mapped into an accessible address space. The command processors 457 can read the commands from registers or memory and determine how those commands can be processed within the GPGPU 470. A thread dispatcher 458 can then be used to dispatch threads to the compute units 460A-460N to perform those commands. Each compute unit 460A-460N can execute threads independently of the other compute units. Additionally, each compute unit 460A-460N can be independently configured for conditional computation and can conditionally output the results of computation to memory. The command processors 457 can interrupt the one or more CPU(s) 446 when the submitted commands are complete.

Graphics Software Architecture

Figure 5:
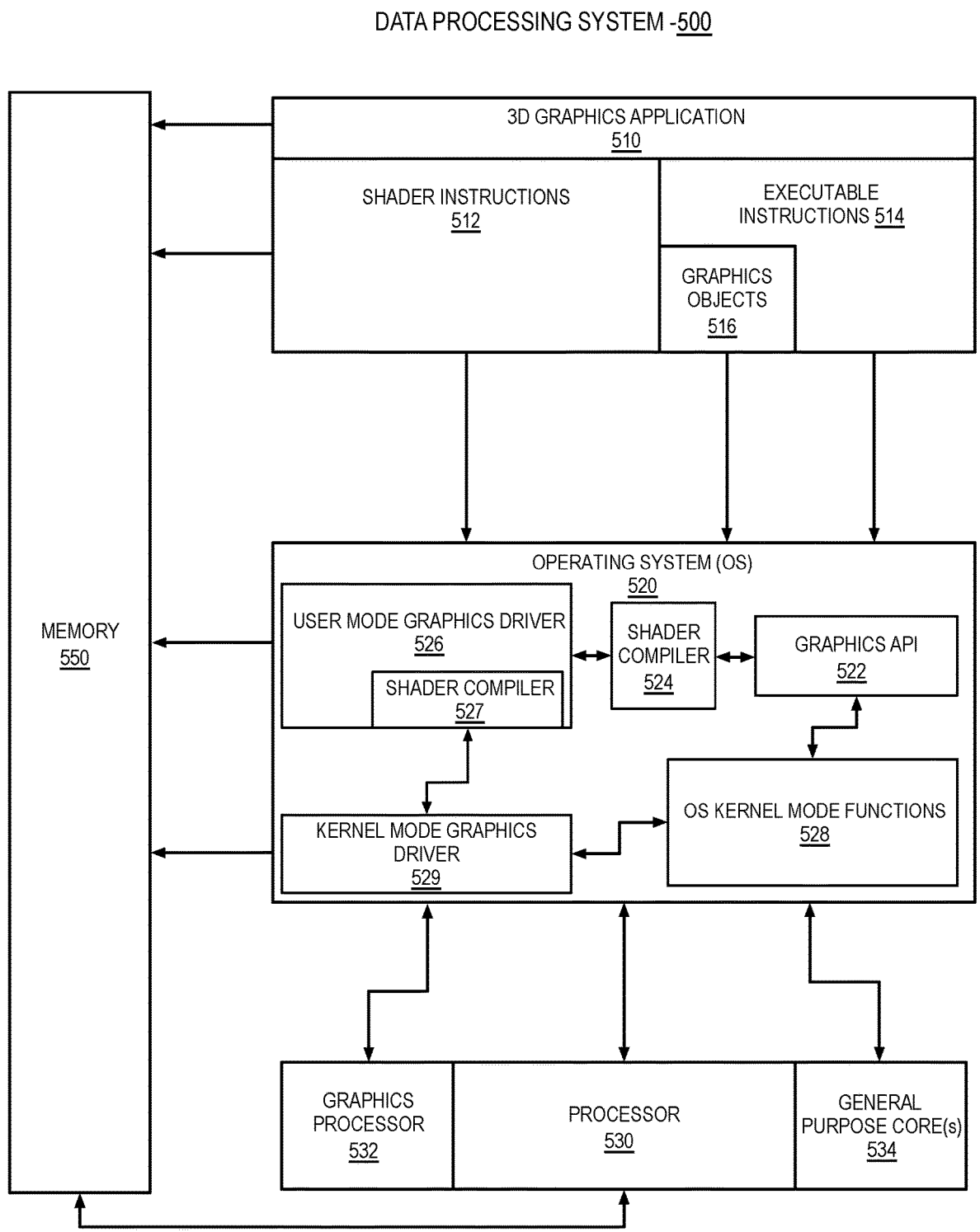
FIG. 5 illustrates example graphics software architecture for a data processing system in accordance with some embodiments.

FIG. 5 illustrates an example graphics software architecture for a data processing system 500 according to some embodiments. In some embodiments, software architecture includes a 3D graphics application 510, an operating system 520, and at least one processor 530. In some embodiments, processor 530 includes a graphics processor 532 and one or more general-purpose processor core(s) 534. The graphics application 510 and operating system 520 each execute in the system memory 550 of the data processing system.

In some embodiments, 3D graphics application 510 contains one or more shader programs including shader instructions 512. The shader language instructions may be in a high-level shader language, such as the High-Level Shader Language (HLSL) of Direct3D, the OpenGL Shader Language (GLSL), and so forth. The application also includes executable instructions 514 in a machine language suitable for execution by the general-purpose processor core 534. The application also includes graphics objects 516 defined by vertex data.

In some embodiments, operating system 520 is a Microsoft® Windows® operating system from the Microsoft Corporation, a proprietary UNIX-like operating system, or an open source UNIX-like operating system using a variant of the Linux kernel. The operating system 520 can support a graphics API 522 such as the Direct3D API, the OpenGL API, or the Vulkan API. When the Direct3D API is in use, the operating system 520 uses a front-end shader compiler 524 to compile any shader instructions 512 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 510. In some embodiments, the shader instructions 512 are provided in an intermediate form, such as a version of the Standard Portable Intermediate Representation (SPIR) used by the Vulkan API.

In some embodiments, user mode graphics driver 526 contains a back-end shader compiler 527 to convert the shader instructions 512 into a hardware specific representation. When the OpenGL API is in use, shader instructions 512 in the GLSL high-level language are passed to a user mode graphics driver 526 for compilation. In some embodiments, user mode graphics driver 526 uses operating system kernel mode functions 528 to communicate with a kernel mode graphics driver 529. In some embodiments, kernel mode graphics driver 529 communicates with graphics processor 532 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 6A:
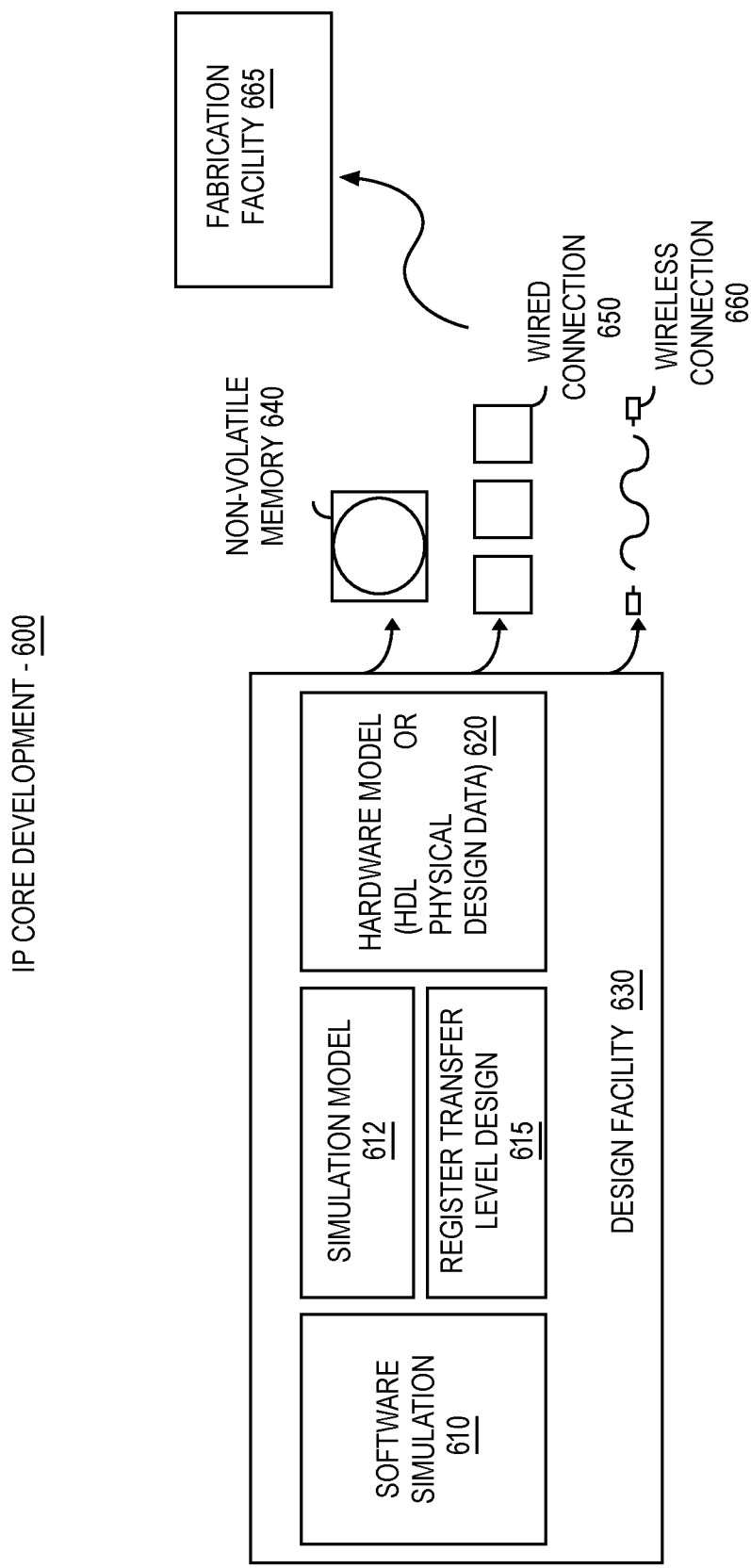
FIG. 6A is a block diagram illustrating an IP core development system in accordance with some embodiments.

FIG. 6A is a block diagram illustrating an IP core development system 600 that may be used to manufacture an integrated circuit to perform operations according to an embodiment. The IP core development system 600 may be used to generate modular, re-usable designs that can be incorporated into a larger design or used to construct an entire integrated circuit (e.g., an SOC integrated circuit). A design facility 630 can generate a software simulation 610 of an IP core design in a high-level programming language (e.g., C/C++). The software simulation 610 can be used to design, test, and verify the behavior of the IP core using a simulation model 612. The simulation model 612 may include functional, behavioral, and/or timing simulations. A register transfer level (RTL) design 615 can then be created or synthesized from the simulation model 612. The RTL design 615 is an abstraction of the behavior of the integrated circuit that models the flow of digital signals between hardware registers, including the associated logic performed using the modeled digital signals. In addition to an RTL design 615, lower-level designs at the logic level or transistor level may also be created, designed, or synthesized. Thus, the particular details of the initial design and simulation may vary.

The RTL design 615 or equivalent may be further synthesized by the design facility into a hardware model 620, which may be in a hardware description language (HDL), or some other representation of physical design data. The HDL may be further simulated or tested to verify the IP core design. The IP core design can be stored for delivery to a $3^{rd}$ party fabrication facility 665 using non-volatile memory 640 (e.g., hard disk, flash memory, or any non-volatile storage medium). Alternatively, the IP core design may be transmitted (e.g., via the Internet) over a wired connection 650 or wireless connection 660. The fabrication facility 665 may then fabricate an integrated circuit that is based at least in part on the IP core design. The fabricated integrated circuit can be configured to perform operations in accordance with at least one embodiment described herein.

Figure 6B:
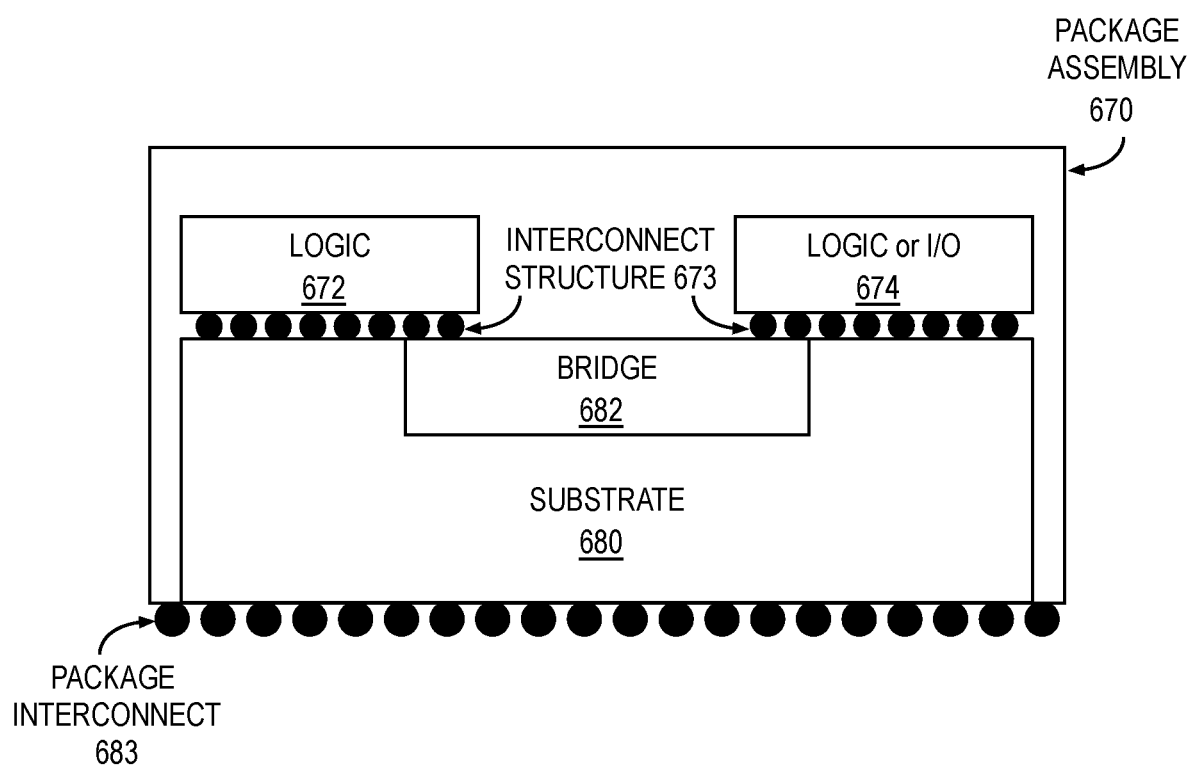
FIG. 6B illustrates a cross-section side view of an integrated circuit package assembly in accordance with some embodiments.

FIG. 6B illustrates a cross-section side view of an integrated circuit package assembly 670, according to some embodiments described herein. The integrated circuit package assembly 670 illustrates an implementation of one or more processor or accelerator devices as described herein. The package assembly 670 includes multiple units of hardware logic 672, 674 connected to a substrate 680. The logic 672, 674 may be implemented at least partly in configurable logic or fixed-functionality logic hardware, and can include one or more portions of any of the processor core(s), graphics processor(s), or other accelerator devices described herein. Each unit of logic 672, 674 can be implemented within a semiconductor die and coupled with the substrate 680 via an interconnect structure 673. The interconnect structure 673 may be configured to route electrical signals between the logic 672, 674 and the substrate 680, and can include interconnects such as, but not limited to bumps or pillars. In some embodiments, the interconnect structure 673 may be configured to route electrical signals such as, for example, input/output (I/O) signals and/or power or ground signals associated with the operation of the logic 672, 674. In some embodiments, the substrate 680 is an epoxy-based laminate substrate. The substrate 680 may include other suitable types of substrates in other embodiments. The package assembly 670 can be connected to other electrical devices via a package interconnect 683. The package interconnect 683 may be coupled to a surface of the substrate 680 to route electrical signals to other electrical devices, such as a motherboard, other chipset, or multi-chip module.

In some embodiments, the units of logic 672, 674 are electrically coupled with a bridge 682 that is configured to route electrical signals between the logic 672, 674. The bridge 682 may be a dense interconnect structure that provides a route for electrical signals. The bridge 682 may include a bridge substrate composed of glass or a suitable semiconductor material. Electrical routing features can be formed on the bridge substrate to provide a chip-to-chip connection between the logic 672, 674.

Although two units of logic 672, 674 and a bridge 682 are illustrated, embodiments described herein may include more or fewer logic units on one or more dies. The one or more dies may be connected by zero or more bridges, as the bridge 682 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Figure 6C:
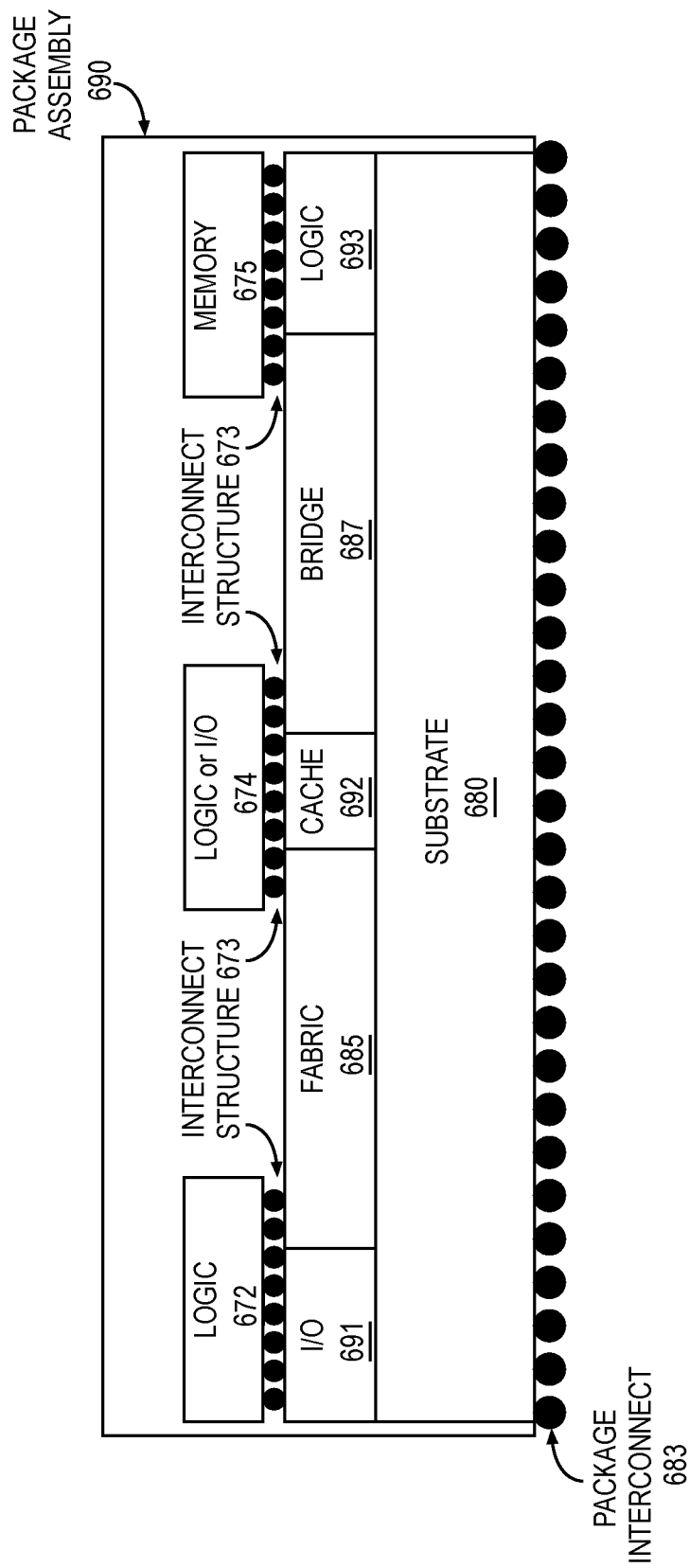
FIG. 6C illustrates a package assembly that includes multiple units of hardware logic chiplets connected to a substrate (e.g., base die) in accordance with some embodiments.

FIG. 6C illustrates a package assembly 690 that includes multiple units of hardware logic chiplets connected to a substrate 680 (e.g., base die). A graphics processing unit, parallel processor, and/or compute accelerator as described herein can be composed from diverse silicon chiplets that are separately manufactured. In this context, a chiplet is an at least partially packaged integrated circuit that includes distinct units of logic that can be assembled with other chiplets into a larger package. A diverse set of chiplets with different IP core logic can be assembled into a single device. Additionally, the chiplets can be integrated into a base die or base chiplet using active interposer technology. The concepts described herein enable the interconnection and communication between the different forms of IP within the GPU. IP cores can be manufactured using different process technologies and composed during manufacturing, which avoids the complexity of converging multiple IPs, especially on a large SoC with several flavors IPs, to the same manufacturing process. Enabling the use of multiple process technologies improves the time to market and provides a cost-effective way to create multiple product SKUs. Additionally, the disaggregated IPs are more amenable to being power gated independently, components that are not in use on a given workload can be powered off, reducing overall power consumption.

The hardware logic chiplets can include special purpose hardware logic chiplets 672, logic or I/O chiplets 674, and/or memory chiplets 675. The hardware logic chiplets 672 and logic or I/O chiplets 674 may be implemented at least partly in configurable logic or fixed-functionality logic hardware and can include one or more portions of any of the processor core(s), graphics processor(s), parallel processors, or other accelerator devices described herein. The memory chiplets 675 can be DRAM (e.g., GDDR, HBM) memory or cache (SRAM) memory.

Each chiplet can be fabricated as separate semiconductor die and coupled with the substrate 680 via an interconnect structure 673. The interconnect structure 673 may be configured to route electrical signals between the various chiplets and logic within the substrate 680. The interconnect structure 673 can include interconnects such as, but not limited to bumps or pillars. In some embodiments, the interconnect structure 673 may be configured to route electrical signals such as, for example, input/output (I/O) signals and/or power or ground signals associated with the operation of the logic, I/O and memory chiplets.

In some embodiments, the substrate 680 is an epoxy-based laminate substrate. The substrate 680 may include other suitable types of substrates in other embodiments. The package assembly 690 can be connected to other electrical devices via a package interconnect 683. The package interconnect 683 may be coupled to a surface of the substrate 680 to route electrical signals to other electrical devices, such as a motherboard, other chipset, or multi-chip module.

In some embodiments, a logic or I/O chiplet 674 and a memory chiplet 675 can be electrically coupled via a bridge 687 that is configured to route electrical signals between the logic or I/O chiplet 674 and a memory chiplet 675. The bridge 687 may be a dense interconnect structure that provides a route for electrical signals. The bridge 687 may include a bridge substrate composed of glass or a suitable semiconductor material. Electrical routing features can be formed on the bridge substrate to provide a chip-to-chip connection between the logic or I/O chiplet 674 and a memory chiplet 675. The bridge 687 may also be referred to as a silicon bridge or an interconnect bridge. For example, the bridge 687, in some embodiments, is an Embedded Multi-die Interconnect Bridge (EMIB). In some embodiments, the bridge 687 may simply be a direct connection from one chiplet to another chiplet.

The substrate 680 can include hardware components for I/O 691, cache memory 692, and other hardware logic 693. A fabric 685 can be embedded in the substrate 680 to enable communication between the various logic chiplets and the logic 691, 693 within the substrate 680. In one embodiment, the I/O 691, fabric 685, cache, bridge, and other hardware logic 693 can be integrated into a base die that is layered on top of the substrate 680. The fabric 685 may be a network on a chip interconnect or another form of packet switched fabric that switches data packets between components of the package assembly.

In various embodiments a package assembly 690 can include fewer or greater number of components and chiplets that are interconnected by a fabric 685 or one or more bridges 687. The chiplets within the package assembly 690 may be arranged in a 3D or 2.5D arrangement. In general, bridge structures 687 may be used to facilitate a point to point interconnect between, for example, logic or I/O chiplets and memory chiplets. The fabric 685 can be used to interconnect the various logic and/or I/O chiplets (e.g., chiplets 672, 674, 691, 693). with other logic and/or I/O chiplets. In one embodiment, the cache memory 692 within the substrate can act as a global cache for the package assembly 690, part of a distributed global cache, or as a dedicated cache for the fabric 685.

Figure 6D:
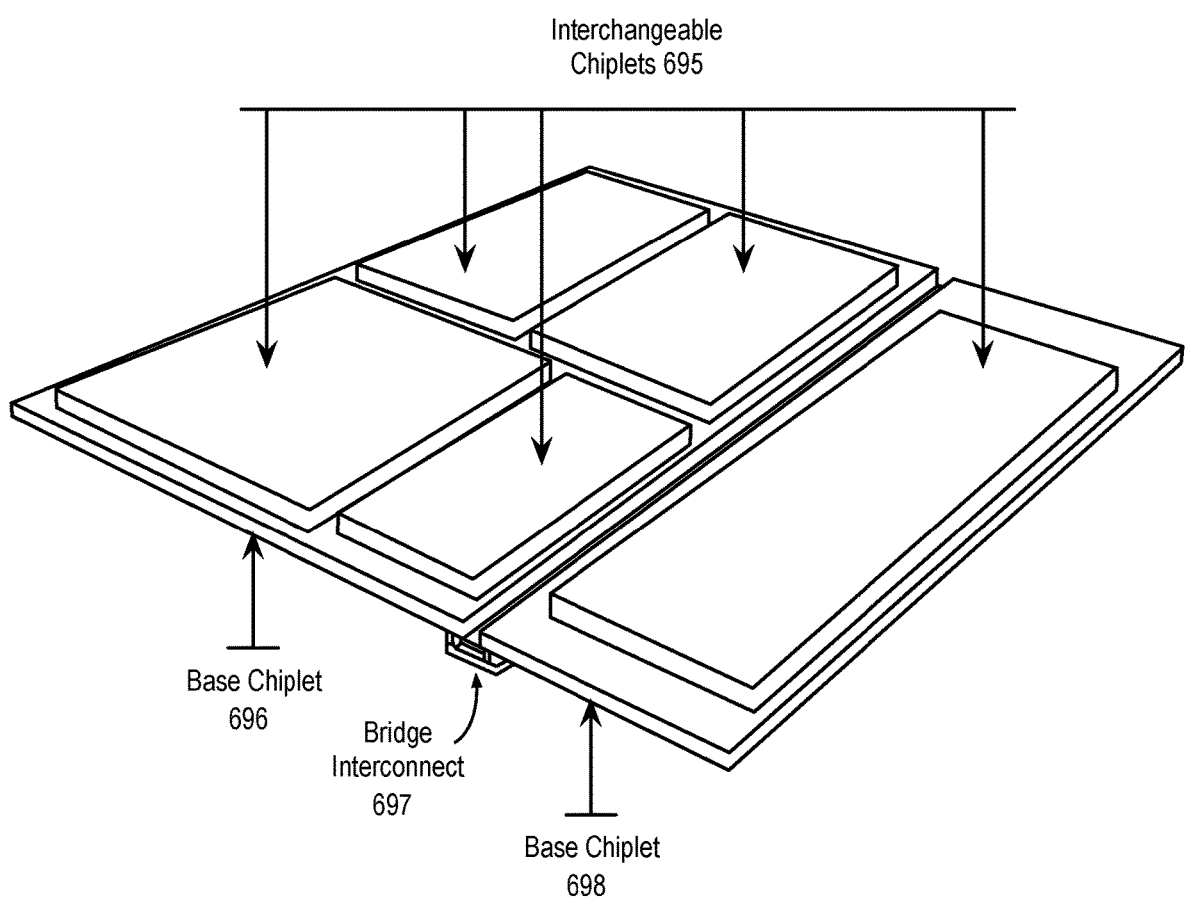
FIG. 6D illustrates a package assembly including interchangeable chiplets in accordance with some embodiments.

FIG. 6D illustrates a package assembly 694 including interchangeable chiplets 695, according to an embodiment. The interchangeable chiplets 695 can be assembled into standardized slots on one or more base chiplets 696, 698. The base chiplets 696, 698 can be coupled via a bridge interconnect 697, which can be similar to the other bridge interconnects described herein and may be, for example, an EMIB. Memory chiplets can also be connected to logic or I/O chiplets via a bridge interconnect. I/O and logic chiplets can communicate via an interconnect fabric. The base chiplets can each support one or more slots in a standardized format for one of logic or I/O or memory/cache.

In one embodiment, SRAM and power delivery circuits can be fabricated into one or more of the base chiplets 696, 698, which can be fabricated using a different process technology relative to the interchangeable chiplets 695 that are stacked on top of the base chiplets. For example, the base chiplets 696, 698 can be fabricated using a larger process technology, while the interchangeable chiplets can be manufactured using a smaller process technology. One or more of the interchangeable chiplets 695 may be memory (e.g., DRAM) chiplets. Different memory densities can be selected for the package assembly 694 based on the power, and/or performance targeted for the product that uses the package assembly 694. Additionally, logic chiplets with a different number of type of functional units can be selected at time of assembly based on the power, and/or performance targeted for the product. Additionally, chiplets containing IP logic cores of differing types can be inserted into the interchangeable chiplet slots, enabling hybrid processor designs that can mix and match different technology IP blocks.

Example System on a Chip Integrated Circuit

Figure 7:
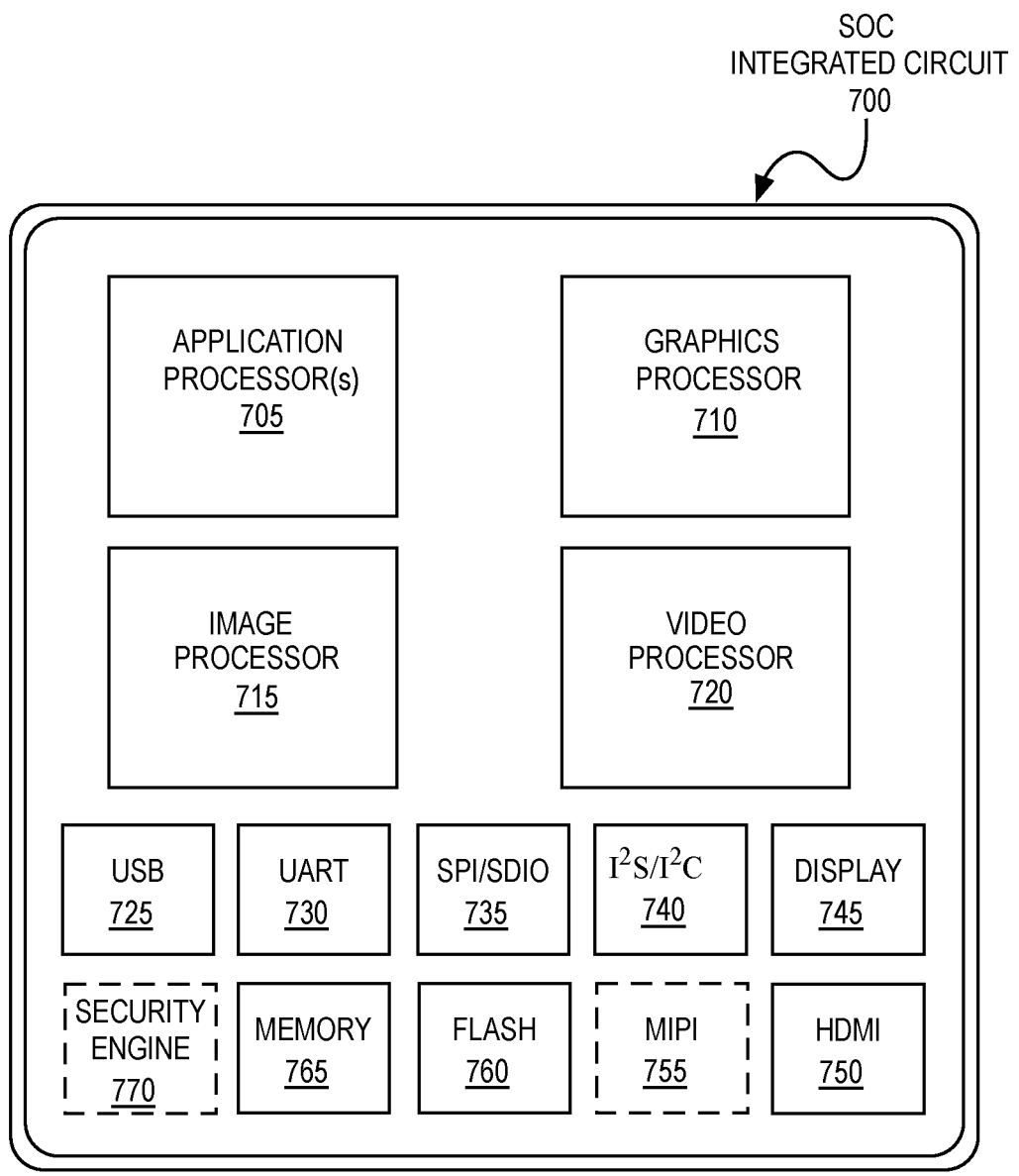
FIG. 7 is a block diagram illustrating an example system on a chip integrated circuit in accordance with some embodiments.

FIG. 7 illustrates an example integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 7 is a block diagram illustrating an example system on a chip integrated circuit 700 that may be fabricated using one or more IP cores, according to an embodiment. Example integrated circuit 700 includes one or more application processor(s) 705 (e.g., CPUs), at least one graphics processor 710, and may additionally include an image processor 715 and/or a video processor 720, any of which may be a modular IP core from the same or multiple different design facilities. Integrated circuit 700 includes peripheral or bus logic including a USB controller 725, UART controller 730, an SPI/SDIO controller 735, and an I$^2$S/I$^2$C controller 740. Additionally, the integrated circuit can include a display device 745 coupled to one or more of a high-definition multimedia interface (HDMI) controller 750 and a mobile industry processor interface (MIPI) display interface 755. Storage may be provided by a flash memory subsystem 760 including flash memory and a flash memory controller. Memory interface may be provided via a memory controller 765 for access to SDRAM or SRAM memory devices. Some integrated circuits additionally include an embedded security engine 770.

Protecting Data Transfer Between a Secure Application and Networked Devices

As previously described, disaggregated computing is on the rise in data centers. Cloud service providers (CSP) are deploying solutions where processing of a workload is distributed on disaggregated compute resources, such as CPUs, GPUs, and hardware accelerators (including field programmable gate arrays (FPGAs)), that are connected via a network instead of being on the same platform and connected via physical links such as peripheral component interconnect express (PCIe). Disaggregated computing enables improved resource utilization and lowers ownership costs by enabling more efficient use of available resources. Disaggregated computing also enables pooling a large number of hardware accelerators for large computation making the computation more efficient and better performing.

Embodiments provide for novel techniques for protecting data transfer between a secure application and networked devices. In some embodiments, the techniques are implemented as part of disaggregate computing for distributed confidential computing environments. These novel techniques are used to provide for the above-noted improved computation efficiency and performance in computing architectures seeking to implement disaggregate computing. Implementations herein facilitate protecting data transfer between a secure application and networked devices, as discussed further below with respect to FIGS. 8-19.

Figure 8:
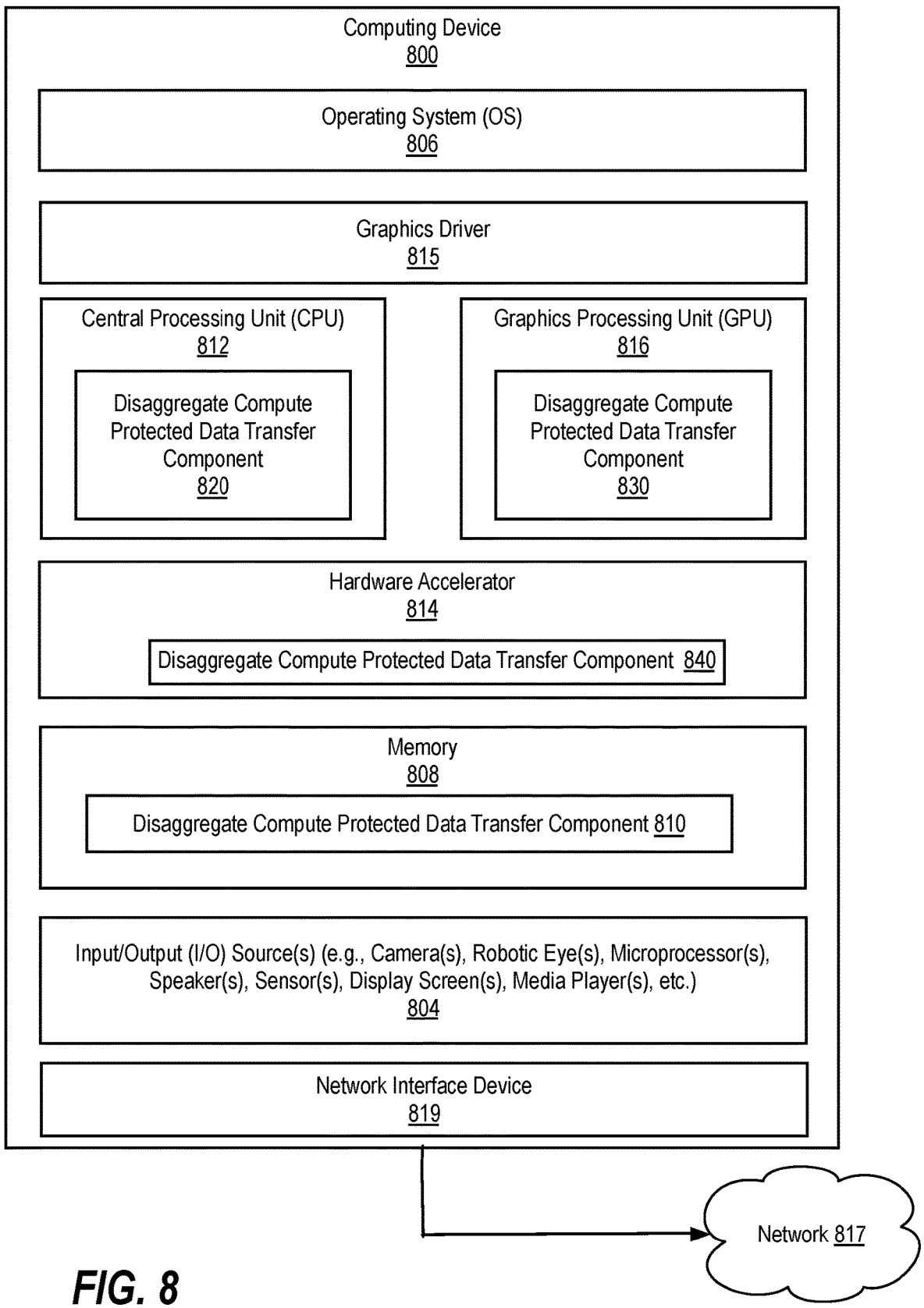
FIG. 8 illustrates a computing device employing a disaggregate compute component, according to implementations herein.

FIG. 8 illustrates a computing device 800 employing a disaggregate compute protected data transfer component 810 according to implementations herein. Computing device 800 represents a communication and data processing device including or representing (without limitations) a server platform including application server platforms and/or remote acceleration server platforms, personal computing devices, smart voice command devices, intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet based cable television set-top boxes, etc.), global positioning system (GPS)-based devices, automotive infotainment devices, etc.

In some embodiments, computing device 800 includes or works with or is embedded in or facilitates any number and type of other smart devices, such as (without limitation) autonomous machines or artificially intelligent agents, such as a mechanical agents or machines, electronics agents or machines, virtual agents or machines, electromechanical agents or machines, etc. Examples of autonomous machines or artificially intelligent agents may include (without limitation) robots, autonomous vehicles (e.g., self-driving cars, self-flying planes, self-sailing boats, etc.), autonomous equipment self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 800 may include a computer platform hosting an integrated circuit ("IC"), such as a system on a chip ("SoC" or "SOC"), integrating various hardware and/or software components of computing device 800 on a single chip.

As illustrated, in one embodiment, computing device 800 may include any number and type of hardware and/or software components, such as (without limitation) graphics processing unit ("GPU" or simply "graphics processor") 816 (such as the graphics processors described above with respect to any one of FIGS. 1-7), graphics driver (also referred to as "GPU driver", "graphics driver logic", "driver logic", user-mode driver (UMD), user-mode driver framework (UMDF), or simply "driver") 815, central processing unit ("CPU" or simply "application processor") 812 (such as the processors or CPUs described above with respect to FIGS. 1-7), hardware accelerator 814 (such as an FPGA, ASIC, a re-purposed CPU, or a re-purposed GPU, for example), memory 808, network devices, drivers, or the like, as well as input/output (I/O) sources 804, such as touchscreens, touch panels, touch pads, virtual or regular keyboards, virtual or regular mice, ports, connectors, etc. Computing device 800 may include operating system (OS) 806 serving as an interface between hardware and/or physical resources of the computing device 800 and a user.

It is to be appreciated that a lesser or more equipped system than the example described above may be utilized for certain implementations. Therefore, the configuration of computing device 800 may vary from implementation to implementation depending upon numerous factors, such as price constraints, performance requirements, technological improvements, or other circumstances.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The terms "logic", "module", "component", "engine", "circuitry", "element", and "mechanism" may include, by way of example, software, hardware and/or a combination thereof, such as firmware.

In one embodiment, as illustrated, disaggregate compute protected data transfer component 810 may be hosted by memory 808 in communication with I/O source(s) 804, such as microphones, speakers, etc., of computing device 800. In another embodiment, disaggregate compute protected data transfer component 810 may be part of or hosted by operating system 806. In yet another embodiment, disaggregate compute protected data transfer component 810 may be hosted or facilitated by graphics driver 815. In yet another embodiment, disaggregate compute protected data transfer component 810 may be hosted by or part of a hardware accelerator 814; for example, disaggregate compute protected data transfer component 810 may be embedded in or implemented as part of the processing hardware of hardware accelerator 814, such as in the form of disaggregate compute protected data transfer component 840. In yet another embodiment, disaggregate compute protected data transfer component 810 may be hosted by or part of (e.g., executed by, implemented in, etc.) graphics processing unit ("GPU" or simply graphics processor") 816 or firmware of graphics processor 816; for example, disaggregate compute protected data transfer component may be embedded in or implemented as part of the processing hardware of graphics processor 816, such as in the form of disaggregate compute protected data transfer component 830.

Similarly, in yet another embodiment, disaggregate compute protected data transfer component 810 may be hosted by or part of central processing unit ("CPU" or simply "application processor") 812; for example, disaggregate compute protected data transfer component may be embedded in or implemented as part of the processing hardware of application processor 812, such as in the form of disaggregate compute protected data transfer component 820. In some embodiments, disaggregate compute protected data transfer component 810 may be provided by one or more processors including one or more of a graphics processor, an application processor, and another processor, wherein the one or more processors are co-located on a common semiconductor package.

It is contemplated that embodiments are not limited to certain implementation or hosting of disaggregate compute protected data transfer component 810 and that one or more portions or components of disaggregate compute protected data transfer component 810 may be employed or implemented as hardware, software, or any combination thereof, such as firmware. In one embodiment, for example, the disaggregate compute protected data transfer component may be hosted by a machine learning processing unit which is different from the GPU. In another embodiment, the disaggregate compute protected data transfer component may be distributed between a machine learning processing unit and a CPU. In another embodiment, the disaggregate compute protected data transfer component may be distributed between a machine learning processing unit, a CPU and a GPU. In another embodiment, the disaggregate compute protected data transfer component may be distributed between a machine learning processing unit, a CPU, a GPU, and a hardware accelerator.

Computing device 800 may host network interface device(s) 819 (such as a network interface card (NIC)) to provide access to a network 817, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface(s) may include, for example, a wireless network interface having antenna, which may represent one or more antenna(s). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMS, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

As aforementioned, terms like "logic", "module", "component", "engine", "circuitry", "element", and "mechanism" may include, by way of example, software or hardware and/or a combination thereof, such as firmware. For example, logic may itself be or include or be associated with circuitry at one or more devices, such as disaggregate compute protected data transfer component 820, disaggregate compute protected data transfer component 830, and/or disaggregate compute protected data transfer component 840 hosted by application processor 812, graphics processor 816, and/or hardware accelerator 814, respectively, of FIG. 8 having to facilitate or execute the corresponding logic to perform certain tasks.

Embodiments provide for novel techniques for protecting data transfer between a secure application and networked devices. These novel techniques can be used to provide for the above-noted improved computation efficiency and performance in computing architectures seeking to implement disaggregated computing.

Implementations herein utilize a disaggregate compute protected data transfer component 810 to provide protecting data transfer between a secure application and networked devices.

With respect to FIG. 8, the disaggregate compute protected data transfer component 810, 820, 830, 840 provides for protecting data transfer between a secure application and networked devices. Further details of the disaggregate compute protected data transfer component 810, 820, 830, 840 are described below with respect to FIGS. 9-19.

Figure 9:
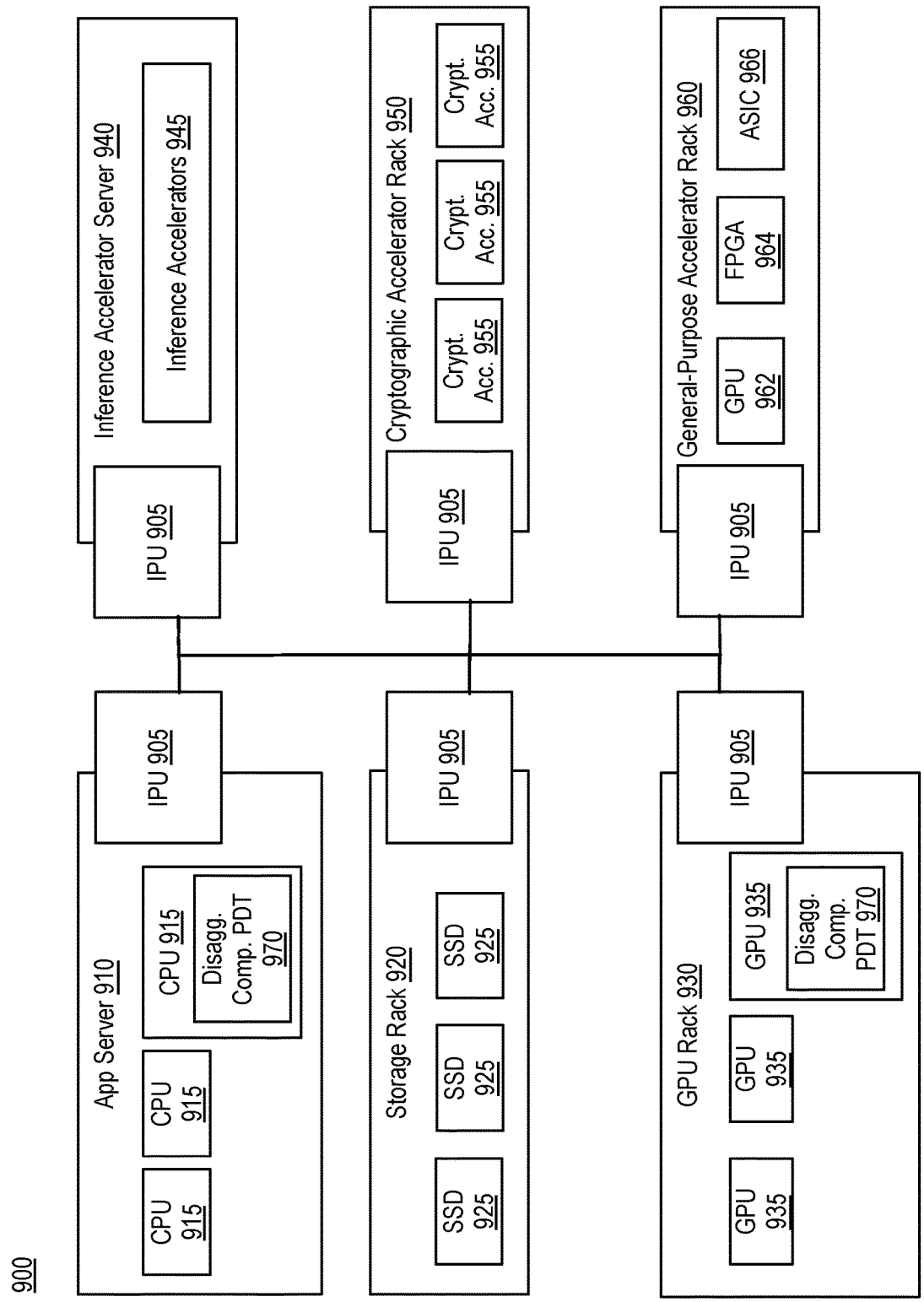
FIG. 9 illustrates disaggregate compute component, according to implementations herein.

FIG. 9 illustrates a datacenter system 900 that provides for protecting data transfer between a secure application and networked devices, in accordance with implementations herein. In one implementation, datacenter system 900 includes one or more resources that can implement a disaggregate compute protected data transfer component ("Disagg. Comp. PDT") 970. The disaggregate compute protected data transfer component 970 is the same as disaggregate compute protected data transfer component 810, 820, 830, 840 described with respect to FIG. 8.

For illustrative example purposes, disaggregate compute protected data transfer components ("Disagg. Comp. PDT") 970 is shown in the CPU 915 and GPU 935, respectively, of datacenter system 900. However, disaggregate compute protected data transfer component 970 may operate in one or more of the various other disaggregated resources of datacenter system 900 in accordance with implementations herein. As such, the resources of datacenter system 900 may be in different platforms connected via a network (such as network 817 of FIG. 8) in the datacenter system 900. In some implementations, software and/or middleware can cause the resources of datacenter system 900 to logically appear to be in the same platform. Furthermore, transport protocols implemented in software and/or hardware (e.g., NICs) can make the remote resources logically appear as if they are local resources as well.

Datacenter system 900 illustrates an example data center (for example, hosted by a cloud service provider (CSP)) providing a variety of XPUs (heterogeneous processing units) for processing tasks at the datacenter, where an XPU can include one or more of: a central processing unit (CPU) 915, a graphics processing unit (GPU) 935 (including a general purpose GPU (GPGPU), ASICs, or other processing units (e.g., accelerators 945, 955, 966, inference accelerators 945, cryptographic accelerators 955, programmable or fixed function FPGAs 964, application-specific integrated circuit (ASICs) 966, compression accelerators, and so on). The datacenter may also provide storage units for data storage tasks, as well. The storage units may include solid state drive (SSD) 925, for example. The XPUs and/or storage units may be hosted with similar-type units (e.g., CPUS 915 hosted on an application server (app server) 910, SSDs 925 hosted on a storage rack 920, GPUs 935 hosted on a GPU rack 930, inference accelerators 945 hosted on an inference accelerator server 940, cryptographic accelerators 955 hosted on a cryptographic accelerator rack 950, and general-purpose accelerators 962, 964, 966 hosted on accelerator rack 960.

The datacenter of system 900 provides its hosted processing components 915, 925, 935, 945, 955, 962, 964, 966 with a variety of offloads using, for example, IPUs 905 that are directly attached to the respective host processing component. Although IPUs 905 are discussed for example purposes, other programmable network devices, such as DPUs or SmartNICs, may be used interchangeable for IPUs 905 herein. The offloads provided may be networking, storage, security, etc. This allows the processing components 915, 925, 935, 945, 955, 962, 964, 966 to run without a hypervisor, and provides CSPs the capability of renting out the entire host in a datacenter to their security-minded customers, or avoid cross-talk and other problems associated with multi-tenant hosts.

An IPU 905 can provide a role in data centers by providing the datacenter operator, such as a Cloud Service Provider (CSP), a control point for security, acceleration, telemetry and service orchestration. IPU 905 architecture may build upon existing Smart Network Interface Card (SmartNIC) features and is a part of controlling security and data acceleration within and across distributed platforms. It is a secure domain controlled by CSPs for managing a platform, providing services to tenants, and securing access into the data center network. The IPU 905 increases the performance and predictability for distributed runtimes and enables scaling to multi-terabit throughputs by offloading host services, reliable transport, and optimizing data copies.

IPUs 905 have grown in complexity over the years, starting with foundational NICs, whose sole purpose was to get packets into the host and out of it. With the addition of networking software offload, the NICs evolved to become SmartNICs, that are capable of offloading functions, such as VSwitch, VIRTIO-Net, AVF, etc. Remote disaggregated storage architectures provide a further evolution, where compute and storage are not co-located anymore, but large compute clusters are connected to large storage clusters over the network. Increase in network speeds, and evolution of protocols made this a possibility. One of the advantages that remote disaggregated storage offers over direct attached storage is that compute and memory can be developed and updated at different cadences. The amount of memory that is attached to a compute node is not limited by physical addition or removal of hard-drives anymore, but can be hot-plugged as a PF to a PCIe Switch. Technologies such as Smart End Point enable IPUs to have firmware-controlled switches, along the PCIe Switch itself to not be limited by hardware implementations.

As discussed above, embodiments herein provide for protecting data transfer between a secure application and networked devices. Embodiments provide a disaggregate compute protected data transfer component 970 that can be hosted at any of the resources of datacenter system 900. For example, disaggregate compute protected data transfer component 970 can be hosted by CPU 915, operating on the app server 910. Disaggregate compute protected data transfer component 970 can also be hosted in any of one or more of IPUs 905, GPUs 935 and 962, FPGAs 964, ASICs 966, inference accelerators 945, cryptographic accelerators 955, and/or other special-purpose hardware accelerators of the datacenter system 900. In one implementation, disaggregate compute protected data transfer component 970 enables transfers of data using any known data transfer protocol. For ease of discussion, implementations herein may be described as implementing an RDMA protocol for the data transfer.

RDMA refers to a direct memory access (DMA) from memory of one computing device into memory of another computing device without involving either computer devices' OSes. RDMA directly copies data between local and remote memory of the computing devices without calling the kernel drivers. Received buffers do not have to be copied twice and the kernel does not use CPU clock cycles for RDMA buffer copy. As such, RDMA enables faster data transfer through networks and reduces the overhead to the CPU because an application and an RDMA Network Interface Controller (RDMA NIC or RNIC) interface directly. In traditional networking, such as sockets, TCP/IP, and Ethernet, the kernel intermediates the interface between the application and the RNIC, resulting in an additional copy of data buffers.

RDMA offers technical advantages including, but not limited to, reducing context switching between user space and kernel space in the OS, eliminating the extra buffer copy, and reducing CPU cycles consumed by the kernel (in host). RDMA also reduces interrupts because it coalesces processing of packets to an interrupt for completion of a RDMA transfer. The RNIC also offloads network transport processing (e.g., TCP/IP) from the host.

As previously discussed with respect to disaggregated computing, computer platforms often have specialized computation devices that specialize to perform specific tasks better than CPU. Applications distribute their work to the best performing device. Offload, or distribution of work used to be limited to devices within the same platform that connects CPU with the accelerators, storage, and memory. This created a problem for scheduling applications on platforms with an ensemble of CPU, accelerator device, storage device, and memory device that optimally match the resource requirements of those applications. The problem was exacerbated with the emergence of applications with higher compute needs than may be installed on a single platform, as in AI/ML, and analytics. These use cases utilize an ensemble of CPU, accelerator devices, storage device, and memory device.

For this reason, datacenters are enabling composable platforms consisting of disaggregated pools of compute resources connected over a network to dynamically form a virtual platform that meets the resource requirements of the application. This avoids overprovisioning platforms with resources to meet the compute needs of the largest application. Aggregation of networked resources also improves resource utilization. For example, if a platform is not available with enough resources for an application, the application can be assigned to free resources in the data center instead of making the application wait for a platform with the resources to free up.

Security sensitive applications that require strong assurance that their workload (data and/or compute logic) has confidentiality and integrity in the presence of software and hardware adversaries use confidential computing. The confidential computing can use hardware-supported trusted execution environments (TEE) on the CPU. Protection of confidential computation and data of the application with the TEE can be restricted to the CPU because protection of the TEE is available within the CPU. If the computation involves use of HW accelerators, such as FPGA and GPU, these accelerators should also support TEEs to provide HW enforced isolation of the customer's workload on the accelerator. In such a solution, the communication between the CPU TEE and Device TEE should be protected such that workload has confidentiality and integrity during transit from software and hardware adversaries on the platforms, as well on the network.

RDMA is an efficient way to transfer data between network-connected compute devices. RDMA enables direct memory copy from one device to a remote device connected through a network. While there are application-level security protocols, such as transport layer security (TLS) and secure sockets layer (SSL), that can used to protect RDMA transfers, they are not suitable for use with RDMA as RDMA read and write operations can operate as purely one-sided communications. Furthermore, these approaches require additional data copying.

RDMA finds use in distributed computation, including disaggregated computing, where the processing elements with the same architecture or different architectures are networked to form a virtual processing platform. For example, where multiple identical CPUs, or combinations of different CPU architectures, and accelerators such as GPUs, FPGAs, ASICs, are connected in a network to cooperate on a computation. Distributed systems/platforms allow dynamic configuration and allocation of resources to match the type of computation (instructions/algorithm) and performance requirements of the application/workload. The dynamic allocation improves efficiency of use of networked components. This higher utilization of resources translates to cost savings and increased profits for the operator of the distributed datacenter.

The data, and sometimes commands, of an application running on a distributed system, are transferred between processing elements to cooperate in the computation. Computation resources (time and logic) used to transfer workloads are counted as overhead of distributed computation relative to processing the workload on processing elements on the same platform (directly connected components). RDMA's efficient data transfer reduces the overhead and latency, enabling better performance of distributed computational systems. In turn, this allows a wider range and more applications to run in distributed systems with higher performance.

Protection of computation in distributed platforms is more complex than in a single platform. Distributed computation exposes data and possibly algorithms (IP in the form of commands) when workloads are shared between processing elements.

Conventional approaches to protecting computations (and their associated communications) in distributed platforms have drawbacks. One convention approach utilizes IPsec protocol to protect RDMA transfers over a network. However, utilization of IPsec still exposes the RDMA transfers to software and hardware attacks on the local platform. In addition, the IP Security (IPSec) protocol does not comprehend RDMA headers and does not provide RDMA source authentication. Another conventional approach protects transfer of data from a CPU to a locally-connected device. However, the protocol of this approach does not protect communication over an Internet Protocol (IP) network commonly used in datacenters.

Another conventional approach enables confidentiality and integrity of data transfers to remote networked devices but utilizes security enhancements to the NIC on the application server and brings the NIC into the application's Trusted Compute Base (TCB). However, bringing the NIC into the TCB boundary increases the attack surface. The potential vulnerabilities of the increased attack surface in the NIC should be mitigated which adds cost to the NIC. The NIC should be enhanced to implement protection on the interface to the host to allow it to securely access data from the application and utilizes the NIC to maintain protection of data on the network interface. The NIC in this conventional approach should also implement isolation of the application's data traffic inside the NIC to become more trustworthy to the application to be included in the TCB.

Implementations herein address the above-described technical problems by protecting data transfer between a secure application and networked devices. Implementations provide for a scheme to efficiently transfer data between network-connected compute devices that have TEEs with protection that preserves confidentiality and integrity during data transfer. This scheme of implementations herein provides a software and hardware protocol using cryptographic engines and/or improved (enhanced) NICs to secure and protect the data transfer. Implementations herein can build on existing TEE technologies to protect communication of enclaves and accelerator devices without requiring changes to the host platform where the Application is running (referred to herein as the application server or application server platform), including no change to the Network Interface Controller (NIC) of the application server. As such, the NIC of the application server may remain an "untrusted" device of the application server.

Implementations herein provide technical advantages by making it possible for networked-connected TEE-capable devices to have end-to-end protection by enabling TEE-equivalent security during efficient data transfers as offered by data transfer protocols, such as RDMA. As such, high-performance, confidential computing can be enabled on a pool of disaggregated device with existing, off-the-shelf NICs. This also means lower overall cost security enhancements to NIC are not added to bring the NIC into the application's trust boundary (e.g., TCB).

Figure 10:
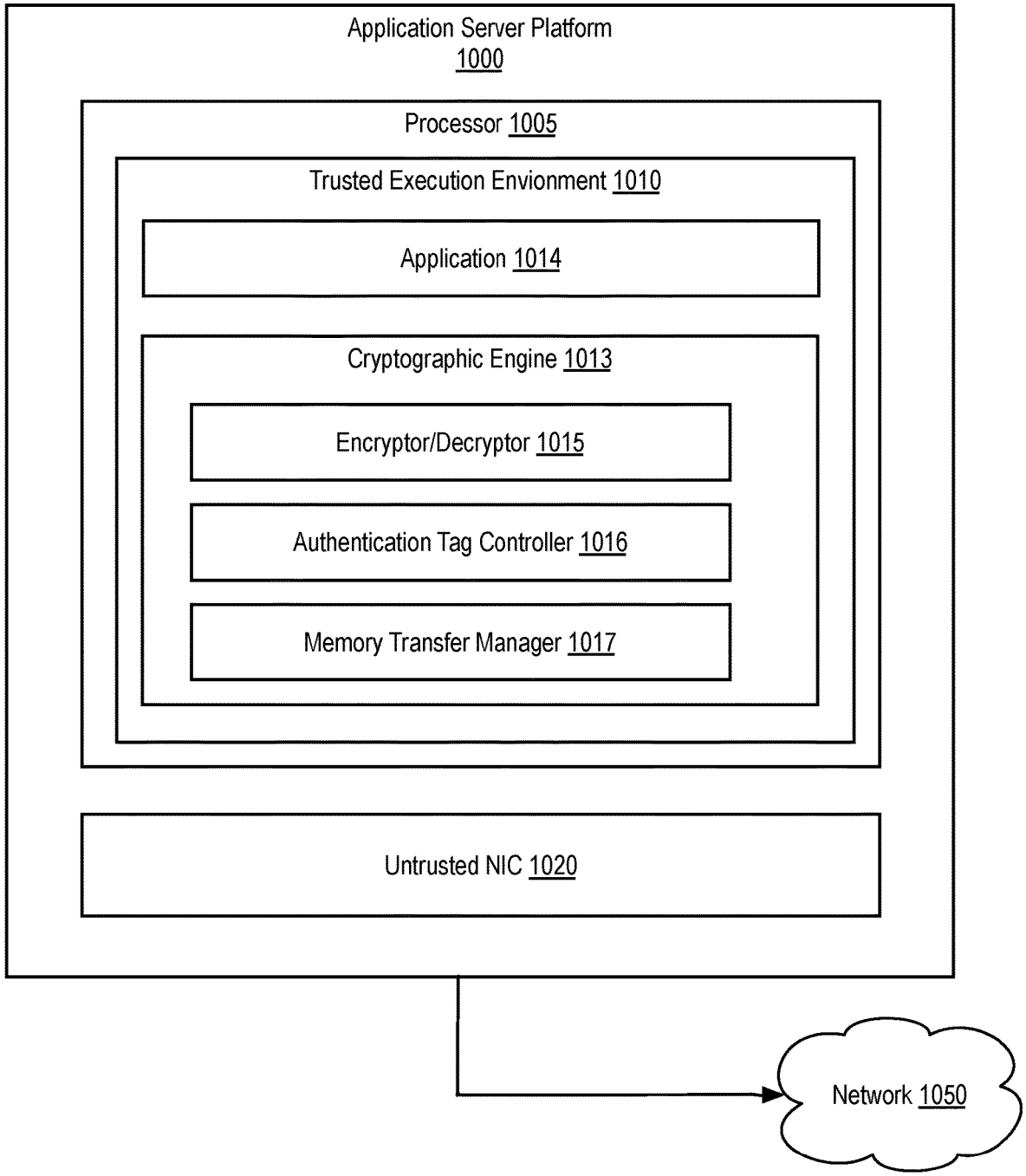
FIG. 10 illustrates a block diagram depicting an application server platform that provides for protecting data transfer between a secure application and networked devices, in accordance with implementations herein.

FIG. 10 illustrates a block diagram depicting an application server platform 1000 that provides for protecting data transfer between a secure application and networked devices, in accordance with implementations herein. The application server platform 1000 may be the same as processing system 100 described with respect to FIG. 1 and/or computing device 200 described with respect to FIG. 2, for example.

In one implementation, the application server platform 1000 may host a NIC 1020 to provide access to a network 1050, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface(s) may include, for example, a wireless network interface having antenna, which may represent one or more antenna(s). Network interface(s) may also include, for example, a wired network interface to communicate with remote devices via network cable, which may be, for example, an Ethernet cable, a coaxial cable, a fiber optic cable, a serial cable, or a parallel cable.

In one implementation, the illustrative application server platform 1000 may include a processor 1005 to establish a TEE 1010 during operation. Processor 1005 may be the same as any of the processors or processing elements discussed above with respect to FIGS. 1-7, for example. The establishment of the TEE 1010 may be in line with the discussion above with respect to FIG. 2 of establishing a TEE (also referred to as a secure enclave) and such discussion applies similarly here with respect to FIG. 10.

As illustrated, the TEE 1010 further includes an application 1014 and a cryptographic engine 1013. In one embodiment, the cryptographic engine 1013 may be the same as disaggregate compute protected data transfer component 970 described with respect to FIG. 9. The cryptographic engine 1013 may include an encryptor/decryptor 1015, an authentication tag controller 1016, and/or a memory transfer manager 1017.

The various components of the application server platform 1000 may be embodied as hardware, firmware, software, or a combination thereof. As such, in some embodiments, one or more of the components of the application server platform 1000 may be embodied as circuitry or collection of electrical devices (e.g., cryptographic engine circuitry 1013, encryptor/decryptor circuitry 1015, authentication tag controller circuitry 1016, and/or memory transfer manager circuitry 1017). It should be appreciated that, in such embodiments, one or more of the cryptographic engine circuitry 1013, encryptor/decryptor circuitry 1015, authentication tag controller circuitry 1016, and/or memory transfer manager circuitry 1017 may form a portion of the processor 1005, and/or other components of the processing system 100. Additionally, in some embodiments, one or more of the illustrative components may form a portion of another component and/or one or more of the illustrative components may be independent of one another.

The TEE 1010 may be embodied as a trusted execution environment of the application server platform 1000 that is authenticated and protected from unauthorized access using hardware support of the application server platform 1000. Illustratively, the TEE 1010 may be embodied as one or more secure enclaves established using Intel® SGX technology. The TEE 1010 may also include or otherwise interface with one or more drivers, libraries, or other components of the application server platform 1000 to interface with an accelerator.

The cryptographic engine 1013 is configured to enable protected data transfer between a secure application and networked devices via its components. In implementations here, the cryptographic engine 1013 enables protected data transfer between a secure application, such as application 1014 operating in TEE 1010, using a NIC operating outside of a trust boundary of the application 1014, such as untrusted NIC 1020.

The encryptor/decryptor 1015 is configured to perform a cryptographic operation associated with a data transfer transaction, such as an RDMA transaction. For an RDMA transaction, the cryptographic operation includes encrypting a data item generated by application 1014 to generate an encrypted data item, or decrypting a data item sent to application 1014 to generate a decrypted data item.

The authentication tag controller 1016 is configured to generate an authentication tag in accordance with implementations herein. The authentication tag may be embodied as any hash, message authentication code (MAC), or other value that may be used to authenticate the encrypted data and additional authentication data.

The memory transfer manager 1017 is configured to securely write an initialization command to initialize a secure data transfer, such as an RDMA transfer using untrusted NIC 1020. The memory transfer manager 1017 is further configured to securely configure a descriptor indicative of a memory buffer and a transfer direction. The transfer direction may be source to sink or sink to source. The memory transfer manager 1017 is generally configured to manage a data transfer, such as an RDMA transfer, in accordance with implementations herein.

The description below of protection schemes of implementations herein provide further details of utilization of the cryptographic engine 1013, including the encryptor/decryptor 1015, the authentication tag controller 1016, and the memory transfer manager 1017, to provide protected data transfer between a secure application and networked devices in distributed confidential computing environments, such as in application server platform 1000 of FIG. 10.

As previously noted, implementations herein can utilize any of a variety of data transfer protocols. However, RDMA is discussed herein as an example data transfer protocol. RDMA enables an application and an RDMA-capable NIC (referred to herein as RNIC) to directly access memory of a remote platform, avoiding buffer copy from application memory to kernel memory and avoiding the overhead of switching between the application and the kernel OS or VMM. The application and NIC interface with each other via queues. The application posts requests for memory access and, the RDMA enabled NIC (RNIC), processes the requests to transfer data directly from application's memory to remote memory via remote NIC. Once the transfer is complete, RNIC signals completion of the work requests to the application. The RNIC interface, (i.e., queues) are available to the application on the same platform as the NIC. An application cannot post RDMA work requests to an RNIC on a different platform.

Another characteristic of RDMA is that the NIC processing the RDMA work (i.e., the initiator of RDMA) requests access to memory to the remote NIC through the RDMA protocol. The remote RNIC access the remote memory in response without requiring processing by the CPU of the remote platform.

Figure 11:
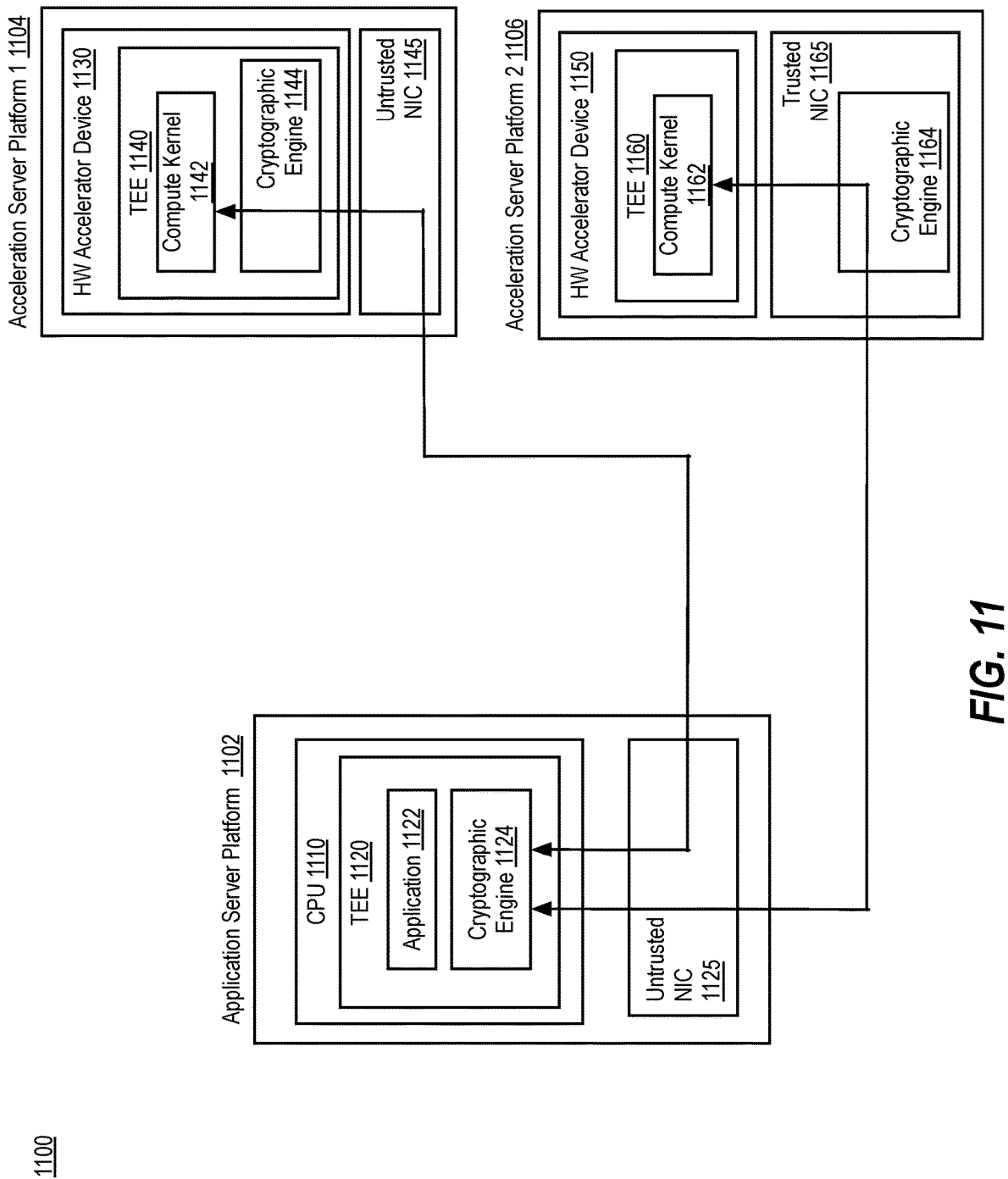
FIG. 11 illustrates a block diagram depicting a computing environment providing for protection of data transfer between a secure application and networked trusted devices, in accordance with implementations herein.

FIG. 11 illustrates a block diagram depicting a computing environment 1100 providing for protection of data transfer between a secure application and networked trusted devices, in accordance with implementations herein. The computing environment 1100 may be a datacenter hosting an application server platform 1102 and one or more of an acceleration server platform 1 1104 and/or an acceleration server platform 2 1106.

In one implementation, application server platform 1102 may be the same as application server platform 1000 described with respect to FIG. 10. As illustrated, application server platform 1102 may include a CPU 1110 and a NIC 1125. CPU 1110 may provide a TEE 1120 in which an application 1122 and a cryptographic engine 1124 are running. As such, application 1122 may be referred to as a secure application 1122. NIC 1125 may be referred to herein as an untrusted NIC 1125 as it is not part of the TCB of the application 1122 provided by the TEE 1120.

Application server platform 1102 may be communicably coupled, for example via a network (e.g., local area network or wide area network, etc.), to one or more acceleration server platforms, such as acceleration server platform 1 1104 and/or acceleration server platform 1106. Acceleration server platform 1104, 1106 may host one or more hardware (HW) accelerator devices 1130, 1150 used to accelerate workloads of an application 1122 running on CPU 1110 of application server platform 1102. HW accelerator devices 1130, 1150 may include, but are not limited to, GPUs, FPGAs, ASICs, compression accelerators, cryptographic accelerators, special-purpose CPUs, and so on. Acceleration server platforms 1104, 1106 may be provided in computing environment 1100 to facilitate disaggregated computing in the computing environment 1100.

HW accelerator devices 1130, 1150 may include a TEE 1140, 1160 in which a compute kernel 1142, 1162 operates. Acceleration server platforms 1104, 1106 further include NICs 1145, 1165. NIC 1145 is not modified to operate as part of a TCB of the acceleration server platform 1104, so is considered an untrusted NIC 1145. NIC 1165 is modified to operate as part of a TCB of the acceleration server platform 1106, so is considered a trusted NIC 1165. In acceleration server platform 1 1104, a cryptographic engine 1144 is depicted as operating with the TEE 1140, and thus is a trusted component of the acceleration server platform 1 1104. In acceleration server platform 2 1106, the cryptographic engine 1164 is part of the trusted NIC 1165, so is also considered a trusted component of the acceleration server platform 1106.

In implementations herein, the computing environment 1100 provides for protecting data transfers between the secure application 1122 of the application server platform 1102 and networked devices, such as the HW accelerator devices 1130, 1150 of the acceleration server platforms 1104, 1106. The secure (i.e., trusted) application 1122 running inside the TEE 1120 on the application server platform 1102 performs secure memory transfers to the trusted compute kernel 1142, 1162 (e.g., accelerated part of application 1122 workload's memory on the remote acceleration server platforms 1104, 1106).

As shown in computing environment 1100, the application server platform 1102 includes a standard NIC 1125 with no special capabilities to support confidential computing (i.e., untrusted). In implementations herein, the standard (untrusted) NIC 1125 of the application server platform 1102 may communicate with various trusted and/or untrusted versions of NICs on the acceleration server platforms 1104, 1106 in the computing environment 1100. For example, acceleration server platform 1 1104 includes a NIC 1145 that is untrusted and is outside the TCB. Acceleration server platform 2 1106 includes a NIC 1165 that is integrated and is trusted, meaning it is inside the TCB and can access compute kernel's 1162 memory directly.

Implementations herein provide for intelligent cryptographic engines 1144, 1164 to facilitate memory-to-memory transfers with confidentiality and integrity, using an untrusted, standard NIC 1125 on the application server platform 1102. On the application server platform 1102, the cryptographic engine 1124 can be a hardware, firmware, and/or software linked to the secure application 1122 running inside the TEE 1120. On the acceleration server platforms 1104, 1106, the cryptographic engines can be hardware, firmware, and/or software that perform encryption/decryption, as well as integrity verification, during data transfers to the HW accelerator device's 1130, 1150 memory. Cryptographic engine 1124 can be used to encrypt and provide integrity verification for a workload of application 1122. This encrypted workload can then be communicated over a network to an acceleration server platform 1104, 1106 of the computing environment 1100 in a secure manner.

In implementations herein, the application 1122 and application control logic in the TEE 11440, 1160 of the acceleration server platforms 1104, 1106 perform an attestation and key exchange to establish an integrity protected channel between the application server platform 1102 (local platform) and the acceleration server platforms 1104, 1106 (remote platforms). In some implementations, this attestation and key exchange protocol can follow standard protocols, such as Security Protocol and Data Model (SPDM). Implementations herein further enhance the protocol to add messages exchanged between the local and remote platforms to setup and synchronize the data transfers. These messages serve equivalent functionality as secure MMIO to setup a data transfer and exchange information utilized to verify the integrity of the data transferred.

Figure 12:
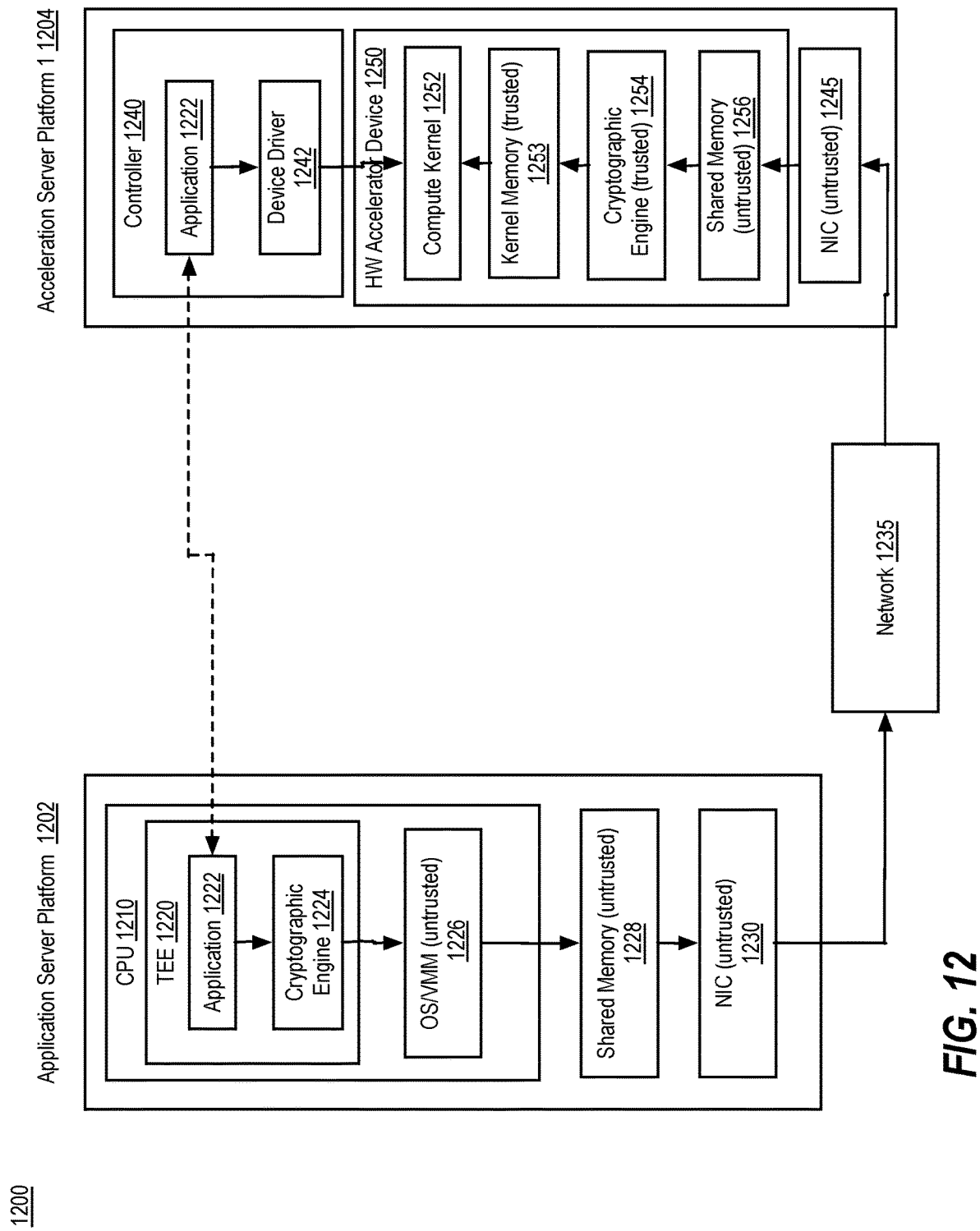
FIG. 12 is a block diagram depicting a computing environment for protecting data transfer between a secure application in a local platform having a standard network interface care (NIC) (untrusted) and networked devices in a remote platform having a standard NIC (untrusted), in accordance with implementations herein.

FIG. 12 is a block diagram depicting a computing environment 1200 for protecting data transfer between a secure application in a local platform having a standard NIC (untrusted) and networked devices in a remote platform having a standard NIC (untrusted), in accordance with implementations herein. Computing environment 1200 includes an application server platform 1202 communicably coupled to an acceleration server platform 1 1204. In one implementation, application server platform 1202 is the same as application server platform 1102 described with respect to FIG. 11 and acceleration server platform 1 1204 is the same as acceleration server platform 1 1104 described with respect to FIG. 11. Components of FIG. 12 with identical and/or similar names to components of FIG. 11 may be considered the same components for purposes of the description herein.

Application server platform 1202 includes a CPU 1210 implementing a TEE 1220 hosting secure application 1222 and cryptographic engine 1224. TEE 1220, including application 1222 and cryptographic engine 1224, may interface with an OS and/or VMM 1226 that is not part of the TCB of the TEE 1220, and thus is considered an untrusted component of the application server platform 1202. OS/VMM 1226 may interface with shared memory 1228 (untrusted) of the application server platform 1202, which is accessibly by a NIC 1230, such as RDMA NIC (RNIC), which is a standard NIC that is not enhanced to be part of the TCB of the TEE 1220 (and thus is untrusted). Application server platform 1202 may use NIC 1230 to communicate over network 1235 with acceleration server platform 1 1204, using a data transfer protocol (such as RDMA).

Acceleration server platform 1 1204 includes a controller 1240 hosting application 1222 and one or more device drivers 1242 for HW accelerator device 1250. Application 1222 and device driver 1242 can be part of a TCB of the application 1222. HW accelerator device 1250 can include a compute kernel 1252 (trusted), kernel memory 1253 (trusted), cryptographic engine 1254 (trusted), shared memory 1256 (untrusted), and an NIC 1245 that is not enhanced to be part of the TCB of application 1222 (e.g., standard NIC that is untrusted).

In acceleration server platform 1 1204, NIC 1245 is untrusted and the encrypted payload from application server platform 1202 is written into untrusted memory 1256 as the NIC 1245 cannot directly write to compute kernel's 1252 private memory 1253. Cryptographic engine 1254, which is in the TCB of the compute kernel 1252, reads encrypted data from the buffer in shared memory 1256, decrypts and verifies the incoming payload, and then writes cleartext content to compute kernel's 1252 private memory 1253. In this example, the untrusted NIC 1245 cannot directly write to compute kernel's 1252 memory 1253.

Implementations herein allow an untrusted NIC 1245 on the acceleration server platform 1 1204 to read the compute kernel's 1252 private memory 1253 because the cryptographic engine 1224 (on the application server platform 1202) encrypts data being transferred from application server platform 1202 to the acceleration server platform 1 1204. As such, cypher text is read from the compute kernel memory 1253 on the acceleration server platform 1 1204, which maintains the security and confidentiality of the data transfer.

Figure 13:
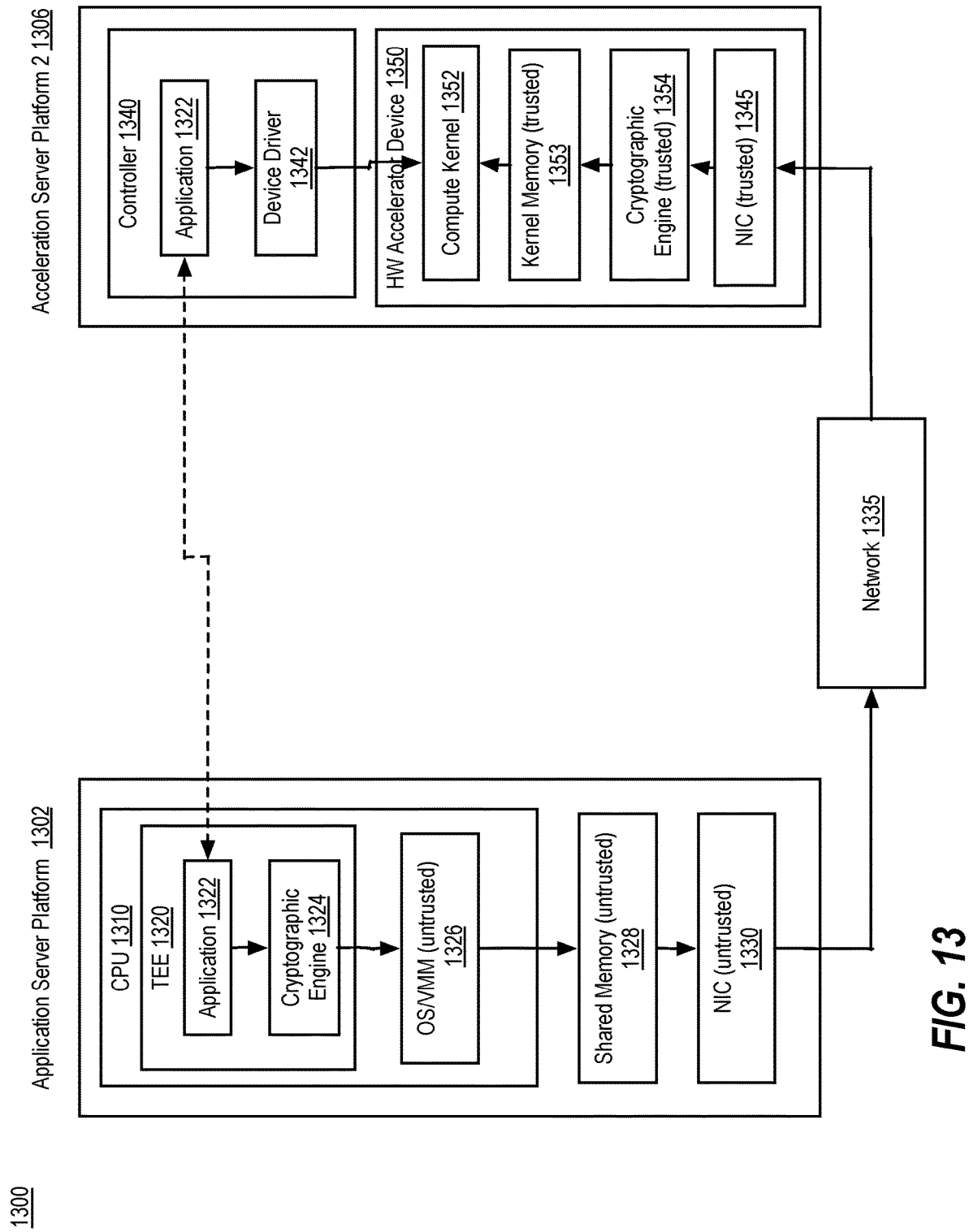
FIG. 13 is a block diagram depicting a computing environment for protecting data transfer between a secure application in a local platform having a standard NIC (untrusted) and networked devices in a remote platform having an enhanced NIC (trusted).

FIG. 13 is a block diagram depicting a computing environment 1300 for protecting data transfer between a secure application in a local platform having a standard NIC (untrusted) and networked devices in a remote platform having an enhanced NIC (trusted), in accordance with implementations herein. Computing environment 1300 includes an application server platform 1302 communicably coupled to an acceleration server platform 2 1306. In one implementation, application server platform 1302 is the same as application server platform 1102 described with respect to FIG. 11 and acceleration server platform 2 1306 is the same as acceleration server platform 2 1106 described with respect to FIG. 11. Components of FIG. 12 with identical and/or similar names to components of FIG. 11 may be considered the same components for purposes of the description herein.

Application server platform 1302 includes a CPU 1310 implementing a TEE 1320 hosting secure application 1322 and cryptographic engine 1324. TEE 1320, including application 1322 and cryptographic engine 1324, may interface with an OS and/or VMM 1326 that is not part of the TCB of the TEE 1320, and thus is considered an untrusted component of the application server platform 1302. OS/VMM 1326 may interface with shared memory 1328 (untrusted) of the application server platform 1302, which is accessibly by a NIC 1330, such as an RNIC, which is a standard NIC that is not enhanced to be part of the TCB of the TEE 1320 (and thus is untrusted). Application server platform 1302 may use NIC 1330 to communicate over network 1335 with acceleration server platform 2 1306, using a data transfer protocol (such as RDMA).

Acceleration server platform 2 1306 includes a controller 1340 hosting application 1322 and one or more device drivers 1342 for HW accelerator device 1350. Application 1322 and device driver 1342 can be part of a TCB of the application 1322. HW accelerator device 1350 can include a compute kernel 1352 (trusted), kernel memory 1353 (trusted), cryptographic engine 1354 (trusted), and an NIC 1345 that is enhanced to be part of the TCB of application 1322 (trusted).

In acceleration server platform 2 1306, the trusted NIC 1345 can write to the compute kernel's 1352 memory 1353 directly. In this scenario, the cryptographic engine 1354 may be part of the NIC 1345 to decrypt the received payload inline and write directly into the compute kernel's 1352 private memory 1353, instead of writing to a temporary buffer. This can eliminate at least one buffer copy, which offers performance efficiencies for implementations herein. An enhanced and integrated NIC 1345 is illustrative of NIC implementations that are trusted to write to the compute kernel's 1352 private memory 1353. An implementation with a NIC 1345 that is not integrated, but is enhanced to be trusted to access private memory 1353 of the compute kernel 1352, would offer the same performance efficiencies as the implementation depicted in computing environment 1300.

With respect to both computing environments 1200 and 1300 of FIGS. 12 and 13, implementations herein can provide for at least two different types of data transfer mechanisms between the application server platform (local platform) and the acceleration server platform (remote platform).

In a first type of data transfer, the data transfer initiated by the NIC 1230, 1330 in the application server platform 1202, 1302. On a data transfer from the secure application 1222, 1322 to the HW accelerator device 1250, 1350, the secure application 1222, 1322 creates a buffer (local buffer) with encrypted and integrity protected data on a shared memory 1228, 1328 in host memory. The secure application 1222, 1322 interfaces with the local NIC 1230, 1330 to initiate copy of the local buffer in the shared memory 1228, 1328 to a remote buffer in either shared memory 1246 (untrusted NIC implementation) or kernel memory 1353 (trusted NIC implementation) on the remote platform. A NIC 1230, 1330 as present in current datacenters, with no special requirements or enhancements, may be used for this step. Buffer copy over the network may be accomplished through RDMA or any other high-performance protocol supported by the NIC 1230, 1330. Because the payload is encrypted, the untrusted and potentially compromised NIC 1230, 1330 cannot steal it.

In implementations herein, any modification or effort to replay can be detected on the remote (accelerator) platform 1204, 1306. For example, the local application 1222, 1322 can send a message to the remote platform 1204, 1306 to inform the remote platform 1204, 1306 that new data is available at the remote platform 1204, 1306. This message can also include information for the remote HW accelerator device 1250, 1350 to verify the integrity of the data that was placed in the remote platform 1204, 1306. The message may also include information (e.g., an authentication tag, such as a MAC) to verify that the message is from the local secure application 1222, 1322 and is not corrupted.

In one example, an RDMA SEND message can include a MAC (authentication tag) calculated over the message payload using a shared secret key. The integrity protected RDMA SEND message plays the role that secure MMIO had in configuring DMA and communicate MAC of the payload in a local platform RDMA data transfer protocol.

In some implementations, the message may be integrity protected using a key derived from the key exchanged during the attestation and key exchange protocol phase. The integrity of the data buffer that is being sent can be protected using a key derived from the key exchanged during the attestation and key exchange phase. In some implementations, the integrity of the message and the integrity of the buffer may be protected against replay using counters known by both sides that is not repeated for different messages or data buffers.

In a second type of data transfer, the secure application 1222, 1322 may offload the transfer over the network 1235, 1335 to the remote platform 1204, 1306. In this second type, instead of moving data using the local NIC 1230, 1330 of the application server platform 1202, 1302, the message (e.g., RDMA SEND message) includes a request for the remote HW accelerator device 1250, 1350 to initiate the network transfer through the remote NIC 1245, 1345. Memory to memory transfer in this second type is initiated by the NIC 1245, 1345 on the acceleration server platform 1204, 1306 (remote platform).

This second transfer model can enable performance optimizations when the remote platform 1204, 1306 copies data over the network, depending on the implementation of the acceleration server platform 1204, 1306. For example, when the NIC 1345 on the acceleration server platform 2 1306 is trusted to write to the compute kernel's 1352 private memory 1353, decryption and integrity verification may be offloaded to the NIC 1345 and executed in-line as the data is written into the private memory 1353 of the compute kernel 1352. As a result, avoiding a copy to memory outside the compute kernel's memory 1353 on the remote platform 1306 before transfer to the compute kernel's 1352 private memory 1353 reduces latency.

In implementations herein, datacenters, such as computing environments 1100-1300 of FIGS. 11-13, with standard NICs (untrusted) on their host platforms may add pools of new networked connected accelerator cards that have security enhancements to add protection with low latency in the new accelerator cards.

In the case of remote platforms (e.g., accelerator server platforms) having accelerator cards implemented with enhanced NICs, such as NIC 1345 of FIG. 13, that can access private memory in the remote platform, this case can save a memory copy and implement in-line hardware encryption. In this case, the trusted remote NIC 1345 can initiates the RDMA copy of data from the local buffer in shared memory 1328 of the local application server platform 1302 directly to remote private memory 1353 of the remote platform 1306.

Figure 14:
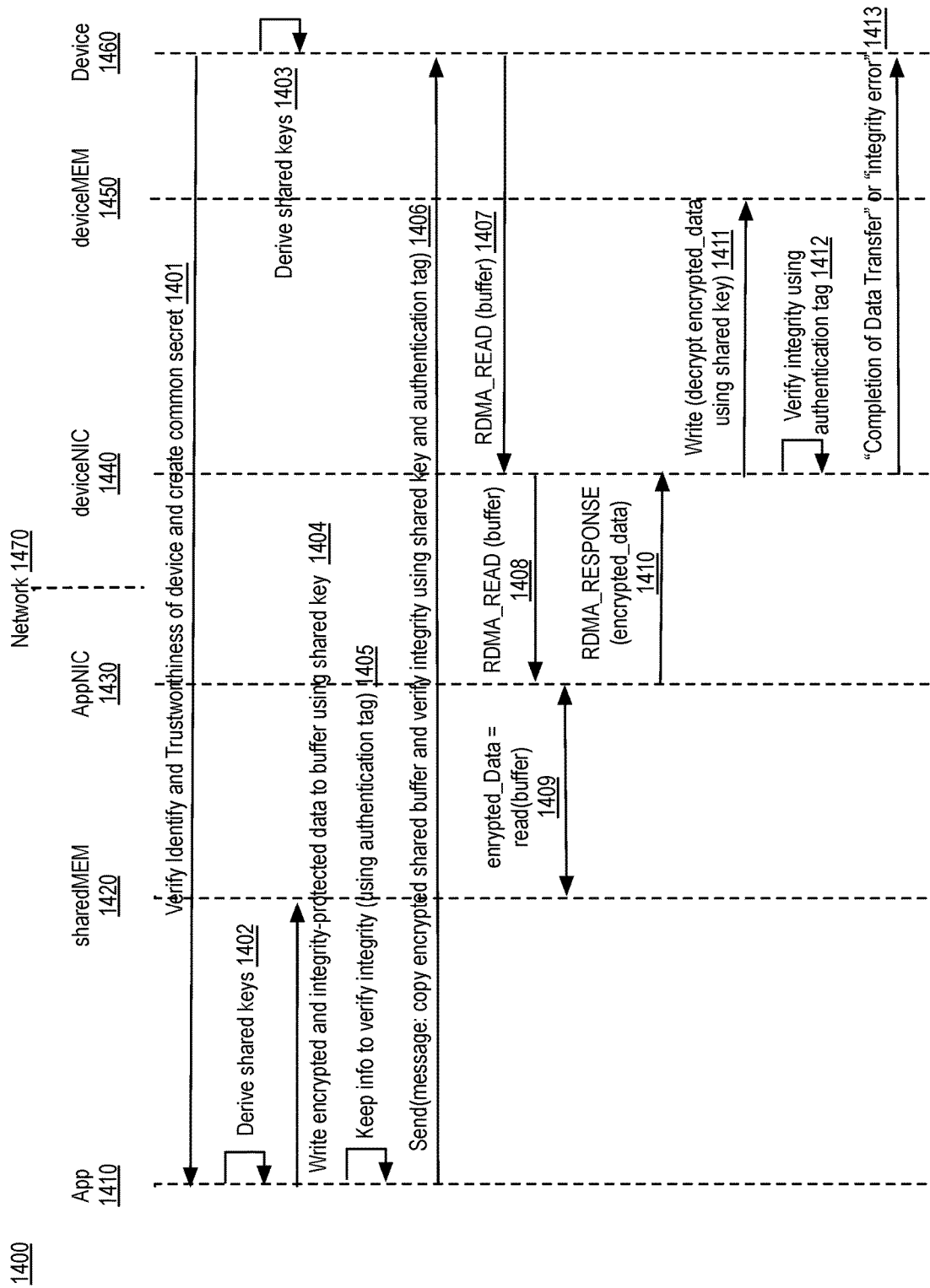
FIG. 14 illustrates an operation flow of offloading data from a secure application to a networked device with an enhanced and trusted NIC, in accordance with implementations herein.

FIG. 14 illustrates an operation flow 1400 of offloading data from a secure application to a networked device with an enhanced and trusted NIC, in accordance with implementations herein. In one implementation, operation flow 1400 depicts operations of an RDMA transaction that is transferring data from a networked accelerator device on a remote platform to a secure application on a local platform. The operations of flow 1400 utilize a plurality of different components at the local platform hosting the secure application and an untrusted NIC, and at the remote platform hosting the networked accelerator device and a trusted (enhanced) NIC.

Although operation flow 1400 is described below as pertinent to a data transfer utilizing a remote platform having a trusted NIC, implementations may also perform data transfers to a remote platform having an untrusted NIC. In this case, the operation flow 1400 would pass through a shared memory on the device of the remote platform before going to a private memory of the compute kernel of the device. Further details of this case are discussed below subsequent to the description of operation flow 1400.

In one implementation, the components in operation flow 1400 include a secure application 1410, shared memory (sharedMEM) 1420, untrusted application NIC (AppNIC) 1430, accelerator device NIC (deviceNIC) 1440, accelerator device memory (deviceMEM) 1450, and the accelerator device (device) 1460. App 1410, sharedMEM 1420, and AppNIC 1430 are located on a local application server platform (such as application server platform 1102, 1202, 1302 of FIGS. 11-13) and are communicably coupled over network 1470 to a remote acceleration server platform (such as acceleration server platforms 1104, 1106, 1204, 1306 of FIGS. 11-13) having deviceNIC 1440, deviceMEM 1450, and device 1460.

In one implementation, before the start of a data transfer, the App 1410 establishes trust and shared keys 1401, 1402, 1403 to protect data transport and messages with the device. Then, the App 1410 prepares a buffer with encrypted data 1404 and maintains information to verify the integrity of the encrypted data 1405. The App 1410 then initiates the transfer by sending a message 1406 to the device 1460 with information for the transfer over the network and information to verify the integrity of the data. In one implementation, the device 1460 uses the message MAC to verify the request is from the App 1410 and is not corrupted before honoring the request.

The controlling application running on the device 1460 process the message to configure the NIC on Application Server to transfer the buffer using RDMA 1407, 1408, 1409, 1410. Logic in the trusted deviceNIC 1440 (e.g., trusted NIC) decrypts 1411 the data in the RDMA READ response as it is written to deviceMem 1450 and verifies 1412 the data matches what the App 1410 intended to have transferred. At this point, the data transfer is complete and the trusted deviceNIC 1440 sends a completion message to the device 1460 with the status of the transfer 1413.

In some implementations, the device 1460 and App 1410 may have agreed on an upper-level protocol (ULP) where the device 1460 may proceed to consume the data. The ULP may cause the device 1460 to send a message with the status of the transfer, or a variety of other possibilities. This allows for the device 1406 to inform the App 1410 that the transfer finished, as well as a report on the success of the transfer.

In the case of the remote platform implementing an untrusted NIC (e.g., standard NIC), operation flow 1400 would change steps 1411 and 1412 to cause the deviceNIC 1440 to write the encrypted data in the RDMA READ response to a shared device memory (not shown). The device 1460 itself would then decrypt the data after it is written to the shared device memory. The decrypted data would then be copied into the deviceMem 1450. The device 1460 would also verify that the decrypted data matches what the App 1410 intended to have transferred.

Figure 15:
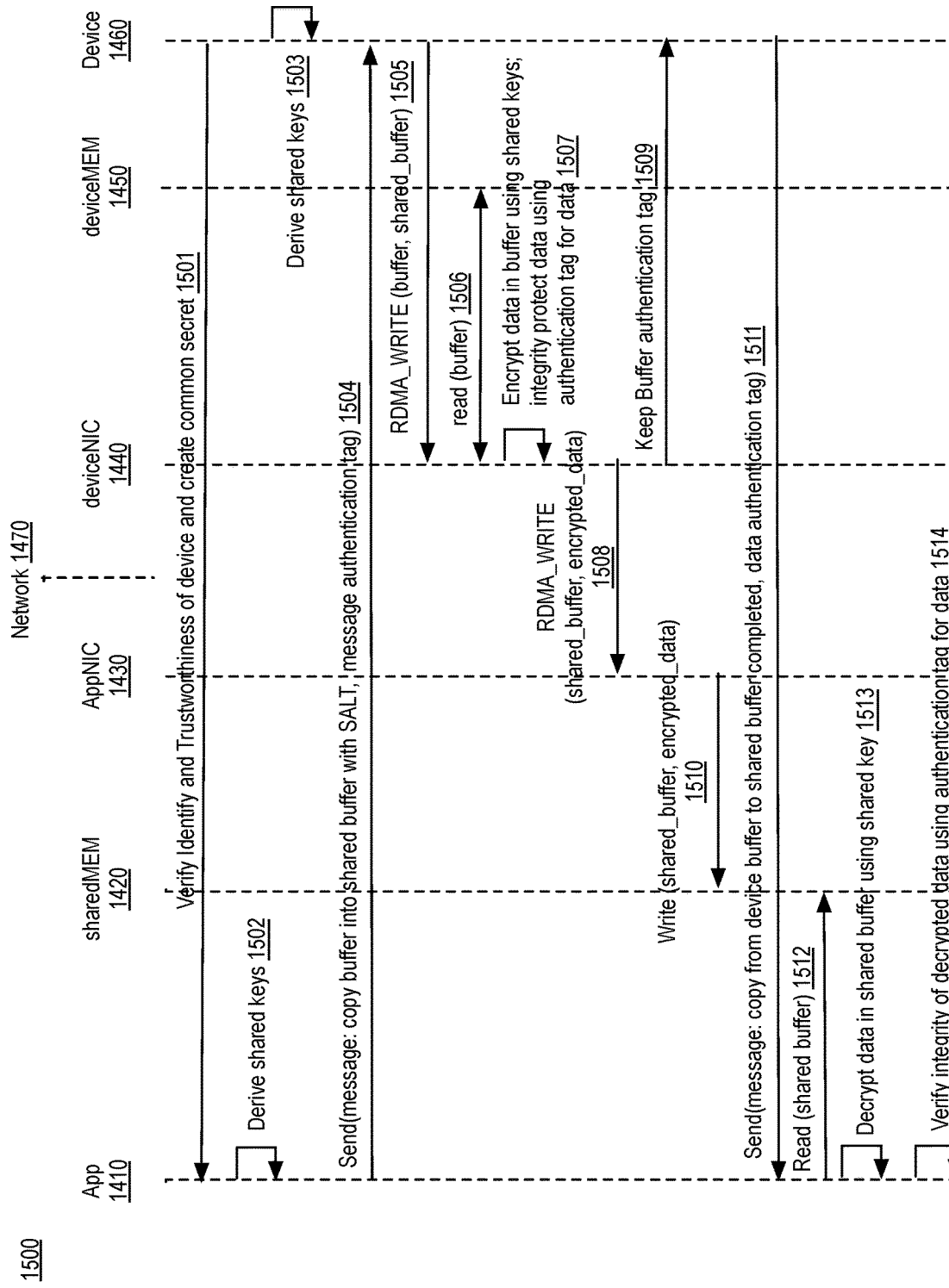
FIG. 15 illustrates an operation flow of transfer of data from a remote device with an enhanced and trusted NIC to an application server having a secure application and untrusted NIC, in accordance with implementations herein.

FIG. 15 illustrates an operation flow 1500 of transfer of data from a remote device with an enhanced and trusted NIC to an application server having a secure application and untrusted NIC, in accordance with implementations herein. In one implementation, operation flow 1500 depicts operations of an RDMA transaction that is transferring data from a networked accelerator device on a remote platform to a secure application on a local platform. The operations of flow 1500 utilize a plurality of different components at the local platform hosting the secure application and an untrusted NIC, and at the remote platform hosting the networked accelerator device and an enhanced and integrated NIC (trusted). In one implementation, the components in operation flow 1500 include the same components 1410-1470 described with respect to operation flow 1400 of FIG. 14, which are similarly operating in operation flow 1500.

Although operation flow 1500 is described below as pertinent to a data transfer utilizing a remote platform having a trusted NIC, implementations may also perform data transfers to a remote platform having an untrusted NIC. In this case, the operation flow 1500 would go from the private memory of the compute kernel of the device to a shared memory on the device of the remote platform before being transferred to the local platform. Further details of this case are discussed below subsequent to the description of operation flow 1500.

Before the start of data transfer, the App 1410 establishes trust and shared keys 1501, 1502, 1503 to protect data transport and messages with the device 1460. In some implementations, this can be done once for all transfers. If the attestation and key exchange have been completed and are still valid, this step 1501, 1502, 1503 is not repeated for each data transfer.

The App 1410 initiates the data transfer by sending a message 1504 to the device 1460 with information for the transfer over the network 1470 and may add information to verify the integrity of the data in this message. In one implementation, the information to verify the integrity of the message may include an authentication tag, including a message authentication tag such as a MAC, to validate the message. The controlling application running on the device 1460 can process the message to configure the NIC 1440 and protection logic on the device 1460 to transfer the buffer 1450 using RDMA 1505, 1506. Logic in the NIC 1440 encrypts the data 1507 as it is read from private memory and calculates an authentication tag 1507 that is sent to the App 1410.

On completion of the RDMA WRITE 1508, the device 1460 sends 1511 a message to the App 1410 to inform the App 1410 that the request for data has been copied and provides information to allow the App 1410 to verify the data in the local buffer of sharedMEM 1420 is the data sent by the device 1460. In one implementation, the information to verify the integrity of the data may include an authentication tag, including a data authentication tag such as a MAC, to validate the data buffer (as opposed to the message). In this example, using RDMA WRITE, the MAC of the sent data that is calculated by the NIC 1440 is passed back 1509 to the device 1460 with the message of completion, which the device 1460 passes to the App 1410 in a message defined in the protocol.

The App 1410 reads 1512 the data from the sharedMEM 1420 and decrypts 1513 and calculates a MAC as it brings the data from sharedMEM 1420 to private memory. The App 1410 consumes the data when it has verified 1514 if the MAC calculated on the local buffer 1420 matches the MAC received from the device 1460.

In the case of the remote platform implementing an untrusted NIC (e.g., standard NIC), operation flow 1500 would change steps 1505-1507 to cause the device 1460 to encrypt the data and integrity-protect the data. The device 1460 would then write the encrypted data to a shared device memory (not shown). The deviceNIC 1440 would then read the encrypted data from the shared device memory and write the encrypted data to a shared buffer for the RDMA WRITE to the AppNIC 1430.

In implementations herein, the protection schemes discussed above can be layered on top of encryption for current solutions. The protection scheme described in implementations herein has the advantage that with adequate choice of encryption and MAC algorithms and what additional data to include in the MAC calculation, the encryption and integrity protection added to protect the data in the data buffer may also protect data in the network. Some implementations may elect to not encrypt data twice, and bypass encryption in current wire protection schemes (e.g., IPSEC) to save processing and implementation complexity.

Figure 16:
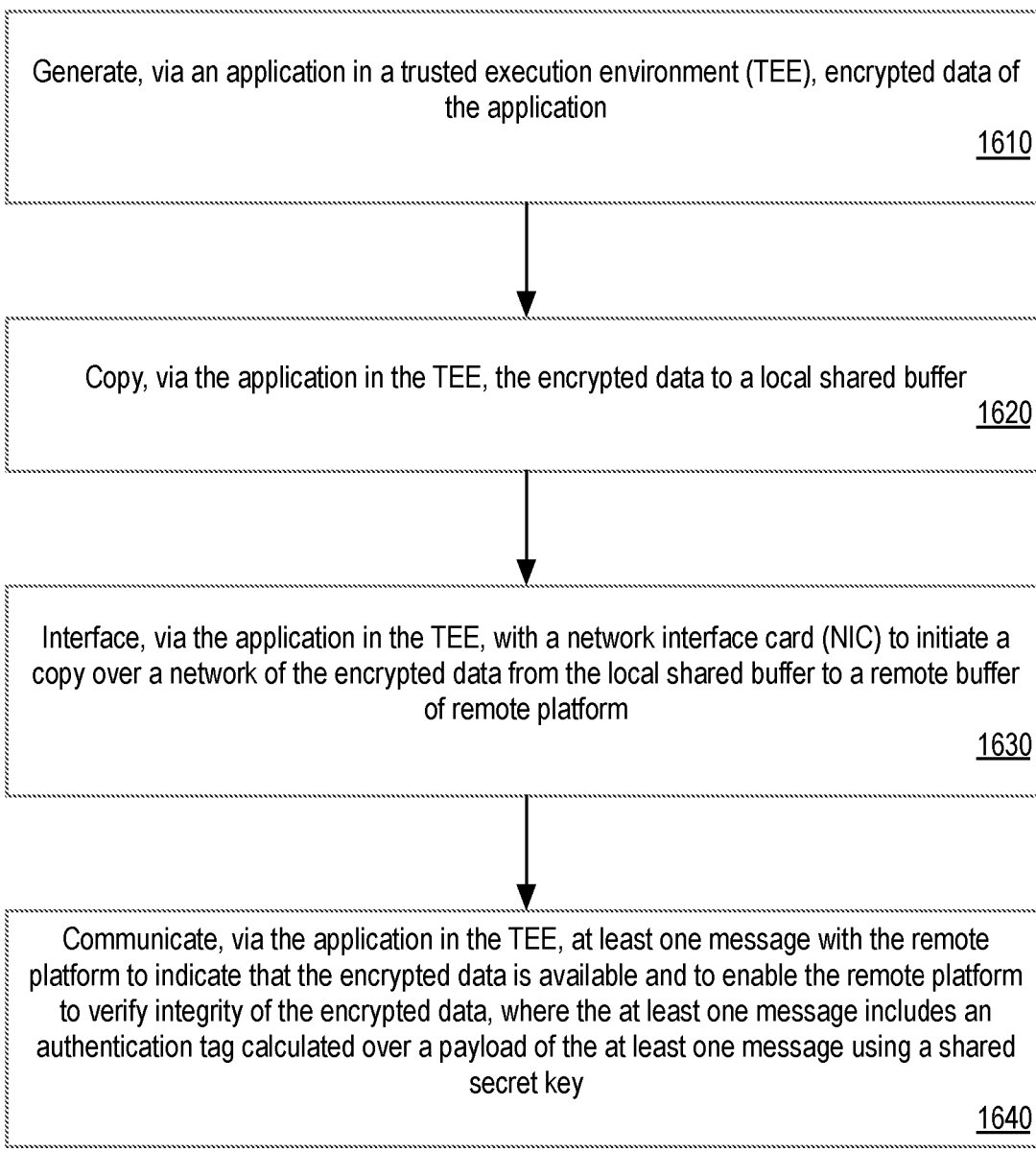
FIG. 16 is a flow diagram illustrating a method for protecting data transfer from a secure application to networked devices, in accordance with implementations herein.

FIG. 16 is a flow diagram illustrating a method 1600 for protecting data transfer from a secure application to networked devices, in accordance with implementations herein. Method 1600 may be performed by processing logic that may comprise hardware (e.g., circuitry, dedicated logic, programmable logic, etc.), software (such as instructions run on a processing device), or a combination thereof. More particularly, the method 1600 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 1600 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 10-15 may not be repeated or discussed hereafter. In one implementation, a processor, such as processor 1005 described with respect to FIG. 10 may perform method 1600. In some implementations, a cryptographic engine, such as cryptographic engine 1013 described with respect to FIG. 10 may perform method 1600.

Method 1600 begins at block 1610 where a processor may generate, via an application in a TEE, encrypted data of the application. At block 1620, the processor may copy, via the application in the TEE, the encrypted data to a local shared buffer of a local platform.

Subsequently, at block 1630, the processor may interface, via the application in the TEE, with a NIC of the local platform to initiate a copy over a network of the encrypted data from the local shared buffer to a remote buffer of a remote platform. Lastly, at block 1640, the processor may communicate, via the application in the TEE, at least one message with the remote platform to indicate that the encrypted data is available and to enable the remote platform to verify the integrity of the encrypted data. In one implementation, the at least one message includes an authentication tag (such as a MAC) calculated over the encrypted data in a payload of the at least one message using a shared secret key established between the local platform and the remote platform.

FIG. 17 is a flow diagram illustrating a method 1700 for protecting data transfer from a secure application to networked devices initiated by a NIC in an application server of the secure application, in accordance with implementations herein. Method 1700 may be performed by processing logic that may comprise hardware (e.g., circuitry, dedicated logic, programmable logic, etc.), software (such as instructions run on a processing device), or a combination thereof. More particularly, the method 1700 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 1700 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 10-16 may not be repeated or discussed hereafter. In one implementation, a processor, such as processor 1005 described with respect to FIG. 10 may perform method 1600. In some implementations, a cryptographic engine, such as cryptographic engine 1013 described with respect to FIG. 10 may perform method 1700.

Method 1700 begins at block 1710 where a processor may establish, by an application running on an application server, an integrity-protected channel with a remote acceleration server via an attestation and key exchange protocol. In one implementation, the key exchange protocol can cause a shared secret key to be derived with the remote acceleration server. At block 1720, the processor may create, in host shared memory of the application server, a buffer including encrypted and integrity-protect data generated by an application executing in a TEE. In one implementation, the data is encrypted using the shared secret key and integrity protected using an authentication tag.

Subsequently, at block 1730, the processor may cause, by an untrusted NIC of the application server, a copy of the local shared buffer to a remote buffer of the remote acceleration server, wherein the untrusted NIC manages the buffer copy process. Lastly, at block 1740, the processor may send, by the application, a message to the remote acceleration server to inform the remote acceleration server that the encrypted and integrity-protected data is available in the remote buffer. In one implementation, the message includes the authentication tag that is generated over the message payload using the shared secret key.

FIG. 18 is a flow diagram illustrating a method 1800 for protecting data transfer from a secure application to networked devices initiated by a NIC in a remote acceleration server of the networked devices, in accordance with implementations herein. Method 1800 may be performed by processing logic that may comprise hardware (e.g., circuitry, dedicated logic, programmable logic, etc.), software (such as instructions run on a processing device), or a combination thereof. More particularly, the method 1800 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 1800 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 10-17 may not be repeated or discussed hereafter. In one implementation, a processor, such as processor 1005 described with respect to FIG. 10 may perform method 1600. In some implementations, a cryptographic engine, such as cryptographic engine 1013 described with respect to FIG. 10 may perform method 1800.

Method 1800 begins at block 1810 where a processor may establish, by an application running on an application server, an integrity-protected channel with a remote acceleration server via an attestation and key exchange protocol. In one implementation, the key exchange protocol to cause a shared secret key to be derived with the remote acceleration server. At block 1820, the processor may create, by an application executing in a TEE, a buffer in host shared memory of the application server including encrypted and integrity-protect data generated. In one implementation, the data is encrypted using the shared secret key and integrity protected using an authentication tag.

Subsequently, at block 1830, the processor may send, by the application, a message to the remote acceleration server to request the remote acceleration server to initiate a network transfer through a remote NIC of the remote acceleration server. In one implementation, the message includes the authentication tag that is generated over the encrypted data using the shared secret key. At block 1840, an untrusted NIC of the application server receives, from the remote NIC, a request to read the encrypted and integrity-protected data from the buffer in host shared memory of the application server.

Lastly, at block 1850, the untrusted NIC returns, in response to the request, the encrypted and integrity-protected data from the buffer (in host shared memory of the application server) to the remote NIC. In one implementation, the remote acceleration server decrypts the data and uses the authentication tag to verify integrity of the data read from the buffer of the host shared memory of the application server. The remote acceleration server may also send a message back to the application server with a status of the transfer, depending on the ULP previously agreed between the application of the application server and the accelerator of the remote acceleration server.

FIG. 19 is a flow diagram illustrating a method 1900 for protecting data transfer from a networked trusted device to a secure application, in accordance with implementations herein. Method 1900 may be performed by processing logic that may comprise hardware (e.g., circuitry, dedicated logic, programmable logic, etc.), software (such as instructions run on a processing device), or a combination thereof. More particularly, the method 1900 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 1900 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 10-18 may not be repeated or discussed hereafter. In one implementation, an application server having a processor, such as application server platform 1000 including processor 1005 described with respect to FIG. 10 may perform method 1900.

Method 1900 begins at block 1910 where an application running on a processor of an application server may establish an integrity-protected channel with a remote acceleration server via an attestation and key exchange protocol. In one implementation, the key exchange protocol to cause a shared secret key to be derived with the remote acceleration server. At block 1920, the processor may send, by the application executing in a TEE of the processor to a remote device of the remote acceleration server, a first message requesting data transfer of data of the remote device to the application. In one implementation, the first message includes a message authentication tag to verify integrity of the first message.

Subsequently, at block 1930, an untrusted NIC of the application may receive encrypted data from a remote NIC of the remote acceleration server. In one implementation, the encrypted data includes the data of the remote device that is encrypted and is integrity-protected by calculation of an authentication tag using the shared secret key. At block 1940, the untrusted NIC of the application server writes the encrypted data to a buffer of a shared memory in the application server. At block 1950, the processor receives, at the application in the TEE, a second message indicating that the data has been copied to the application server. In one implementation, the second message includes a data authentication tag to verify that the data in the buffer is correct, where the data authentication tag is to verify integrity of the data payload.

Then, at block 1960, the processor decrypts, using the application in the TEE, the encrypted data from the buffer using the shared secret key. Lastly, at block 1970, the processor verifies, using the application in the TEE, the integrity of the decrypted data using the data authentication tag. In one implementation, the application in the TEE may also send a third message back to the remote acceleration server with a status of the transfer, depending on the ULP previously agreed between the application of the application server and the remote device of the remote acceleration server.

Flowcharts representative of example hardware logic, machine readable instructions, hardware implemented state machines, and/or any combination thereof for implementing the systems, already discussed. The machine readable instructions may be one or more executable programs or portion(s) of an executable program for execution by a computer processor. The program may be embodied in software stored on a non-transitory computer readable storage medium such as a CD-ROM, a floppy disk, a hard drive, a DVD, a Blu-ray disk, or a memory associated with the processor, but the whole program and/or parts thereof could alternatively be executed by a device other than the processor and/or embodied in firmware or dedicated hardware. Further, although the example program is described with reference to the flowcharts illustrated in the various figures herein, many other methods of implementing the example computing system may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may utilize one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but utilize addition of a library (e.g., a dynamic link library (DLL)), a software development kit (SDK), an application programming interface (API), etc. in order to execute the instructions on a particular computing device or other device. In another example, the machine readable instructions may be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5 and/or 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The following examples pertain to further embodiments. Example 1 is an apparatus to facilitate protecting data transfer between a secure application and networked devices. The apparatus of Example 1 comprises a source network interface controller (NIC); and a processor to provide a trusted execution environment (TEE) to run an application, wherein the source NIC operates outside of a trust boundary of the TEE, and wherein the processor is to: generate, via the application in the TEE, encrypted data of the application; copy, via the application in the TEE, the encrypted data to a local shared buffer; interface, using the application in the TEE, with the source NIC to initiate a copy, over a network, of the encrypted data from the local shared buffer to a remote buffer of a remote platform; and communicate, via the application in the TEE, at least one message with the remote platform to indicate that the encrypted data is available and to enable the remote platform to verify integrity of the encrypted data, wherein the one least one message comprises an authentication tag calculated over a payload of the at least one message using a shared secret key.

In Example 2, the subject matter of Example 1 can optionally include wherein the TEE further comprises a cryptographic engine communicably coupled to the application, the cryptographic engine to encrypt contents of unencrypted data generated by the application as the encrypted data. In Example 3, the subject matter of any one of Examples 1-2 can optionally include wherein the source NIC is a remote direct memory access (RDMA) NIC (RNIC) to perform data transfers with the remote platform using an RDMA protocol.

In Example 4, the subject matter of any one of Examples 1-3 can optionally include wherein the processor is further to establish an integrity-protected channel with the remote platform via an attestation and key exchange protocol, wherein the key exchange protocol is to cause the shared secret key to be derived with the remote platform, and wherein the at least one message is communicated to the remote platform via the integrity-protected channel. In Example 5, the subject matter of any one of Examples 1-4 can optionally wherein the remote platform comprises a remote NIC that is trusted and can write directly to compute kernel memory of the remote platform.

In Example 6, the subject matter of any one of Examples 1-5 can optionally include wherein the remote NIC can perform decryption and integrity verification of the encrypted data in-line as the remote NIC writes to the compute kernel memory of the remote platform. In Example 7, the subject matter of any one of Examples 1-6 can optionally include wherein the remote platform comprises a remote NIC that is untrusted and that writes the encrypted payload into untrusted memory of the remote NIC.

In Example 8, the subject matter of any one of Examples 1-7 can optionally include wherein the remote platform comprises a remote cryptographic engine to perform decryption and integrity verification of the encrypted data in the untrusted memory and cause decrypted and integrity verified data is written into compute kernel memory from the untrusted memory. In Example 9, the subject matter of any one of Examples 1-8 can optionally include wherein the authentication tag comprises a message authentication codes (MACs) to provide integrity protection to the encrypted data.

In Example 10, the subject matter of any one of Examples 1-9 can optionally include wherein the processor to generate, via the application in the TEE, the encrypted data of the application further comprises the processor to apply an encryption library to generate the encrypted data. In Example 11, the subject matter of any one of Examples 1-10 can optionally include wherein the processor comprises one or more of a graphics processing unit (GPU), a central processing unit (CPU), or a hardware accelerator, and wherein the remote platform comprises a hardware accelerator device receiving offload of workloads from the processor.

Example 12 is a method for facilitating protecting data transfer between a secure application and networked devices. The method of Example 12 can include generating, by a processor executing an application running in a trusted execution environment (TEE) of the processor, encrypted data of the application; copying, by the processor using the application in the TEE, the encrypted data to a local shared buffer; interfacing, by the processor using the application in the TEE, with a source network interface card (NIC) to initiate a copy, over a network, of the encrypted data from the local shared buffer to a remote buffer of a remote platform, wherein the source NIC operates outside of a trust boundary of the TEE; and communicating, by the processor using the application in the TEE, at least one message with the remote platform to indicate that the encrypted data is available and to enable the remote platform to verify integrity of the encrypted data, wherein the one least one message comprises an authentication tag calculated over a payload of the at least one message using a shared secret key.

In Example 13, the subject matter of Example 12 can optionally include wherein the TEE further comprises a cryptographic engine communicably coupled to the application, the cryptographic engine to encrypt contents of unencrypted data generated by the application as the encrypted data. In Example 14, the subject matter of Examples 12-13 can optionally include further comprising establishing, via the application, an integrity-protected channel with the remote platform via an attestation and key exchange protocol, wherein the key exchange protocol is to cause the shared secret key to be derived with the remote platform, and wherein the at least one message is communicated to the remote platform via the integrity-protected channel.

In Example 15, the subject matter of Examples 12-14 can optionally include wherein the remote platform comprises a remote NIC that is trusted and can write to compute kernel memory directly, and wherein the remote NIC can perform decryption and integrity verification of the encrypted data in-line as the remote NIC writes to the compute kernel memory of the remote platform. In Example 16, the subject matter of Examples 12-15 can optionally include wherein the remote platform comprises a remote NIC that is untrusted and that writes the encrypted payload into untrusted memory of the remote NIC, and wherein the remote platform comprises a remote cryptographic engine to perform decryption and integrity verification of the encrypted data in the untrusted memory and cause decrypted and integrity verified data is written into compute kernel memory from the untrusted memory.

Example 17 is a non-transitory computer-readable storage medium for facilitating protecting data transfer between a secure application and networked devices. The non-transitory computer-readable storage medium of Example 17 having stored thereon executable computer program instructions that, when executed by one or more processors, cause the one or more processors to perform operations comprising: generating, by a processor executing an application running in a trusted execution environment (TEE) of the processor, encrypted data of the application; copying, by the processor using the application in the TEE, the encrypted data to a local shared buffer; interfacing, by the processor using the application in the TEE, with a source network interface card (NIC) to initiate a copy, over a network, of the encrypted data from the local shared buffer to a remote buffer of a remote platform, wherein the source NIC operates outside of a trust boundary of the TEE; and communicating, by the processor using the application in the TEE, at least one message with the remote platform to indicate that the encrypted data is available and to enable the remote platform to verify integrity of the encrypted data, wherein the one least one message comprises an authentication tag calculated over a payload of the at least one message using a shared secret key.

In Example 18, the subject matter of Example 17 can optionally include wherein the TEE further comprises a cryptographic engine communicably coupled to the application, the cryptographic engine to encrypt contents of unencrypted data generated by the application as the encrypted data. In Example 19, the subject matter of Examples 17-18 can optionally include wherein the one or more processors to perform further operations comprising establishing an integrity-protected channel with the remote platform via an attestation and key exchange protocol, wherein the key exchange protocol is to cause the shared secret key to be derived with the remote platform, and wherein the at least one message is communicated to the remote platform via the integrity-protected channel.

In Example 20, the subject matter of Examples 17-19 can optionally include wherein the remote platform comprises a remote NIC that is trusted and can write to compute kernel memory directly, and wherein the remote NIC can perform decryption and integrity verification of the encrypted data in-line as the remote NIC writes to the compute kernel memory of the remote platform.

Example 21 is a system for facilitating protecting data transfer between a secure application and networked devices. The system of Example 21 can optionally include a memory to store a block of data, a source network interface controller (NIC) communicably coupled to the memory, and a processor communicably coupled to the memory and the source NIC, the processor to provide a trusted execution environment (TEE) to run an application, wherein the source NIC operates outside of a trust boundary of the TEE, and wherein the processor is to: generate, via the application in the TEE, encrypted data of the application; copy, via the application in the TEE, the encrypted data to a local shared buffer; interface, using the application in the TEE, with the source NIC to initiate a copy, over a network, of the encrypted data from the local shared buffer to a remote buffer of a remote platform; and communicate, via the application in the TEE, at least one message with the remote platform to indicate that the encrypted data is available and to enable the remote platform to verify integrity of the encrypted data, wherein the one least one message comprises an authentication tag calculated over a payload of the at least one message using a shared secret key.

In Example 22, the subject matter of Example 21 can optionally include wherein the TEE further comprises a cryptographic engine communicably coupled to the application, the cryptographic engine to encrypt contents of unencrypted data generated by the application as the encrypted data. In Example 23, the subject matter of any one of Examples 21-22 can optionally include wherein the source NIC is a remote direct memory access (RDMA) NIC (RNIC) to perform data transfers with the remote platform using an RDMA protocol.

In Example 24, the subject matter of any one of Examples 21-23 can optionally include wherein the processor is further to establish an integrity-protected channel with the remote platform via an attestation and key exchange protocol, wherein the key exchange protocol is to cause the shared secret key to be derived with the remote platform, and wherein the at least one message is communicated to the remote platform via the integrity-protected channel. In Example 25, the subject matter of any one of Examples 21-24 can optionally wherein the remote platform comprises a remote NIC that is trusted and can write directly to compute kernel memory of the remote platform.

In Example 26, the subject matter of any one of Examples 21-25 can optionally include wherein the remote NIC can perform decryption and integrity verification of the encrypted data in-line as the remote NIC writes to the compute kernel memory of the remote platform. In Example 27, the subject matter of any one of Examples 21-26 can optionally include wherein the remote platform comprises a remote NIC that is untrusted and that writes the encrypted payload into untrusted memory of the remote NIC.

In Example 28, the subject matter of any one of Examples 21-27 can optionally include wherein the remote platform comprises a remote cryptographic engine to perform decryption and integrity verification of the encrypted data in the untrusted memory and cause decrypted and integrity verified data is written into compute kernel memory from the untrusted memory. In Example 29, the subject matter of any one of Examples 21-28 can optionally include wherein the authentication tag comprises a message authentication codes (MACs) to provide integrity protection to the encrypted data.

In Example 30, the subject matter of any one of Examples 21-29 can optionally include wherein the processor to generate, via the application in the TEE, the encrypted data of the application further comprises the processor to apply an encryption library to generate the encrypted data. In Example 31, the subject matter of any one of Examples 21-30 can optionally include wherein the processor comprises one or more of a graphics processing unit (GPU), a central processing unit (CPU), or a hardware accelerator, and wherein the remote platform comprises a hardware accelerator device receiving offload of workloads from the processor.

Example 32 is an apparatus for facilitating protecting data transfer between a secure application and networked devices, comprising means for generating, via a processor executing an application running in a trusted execution environment (TEE) of the processor, encrypted data of the application; means for copying, via the processor using the application in the TEE, the encrypted data to a local shared buffer; means for interfacing, via the processor using the application in the TEE, with a source network interface card (NIC) to initiate a copy, over a network, of the encrypted data from the local shared buffer to a remote buffer of a remote platform, wherein the source NIC operates outside of a trust boundary of the TEE; and means for communicating, via the processor using the application in the TEE, at least one message with the remote platform to indicate that the encrypted data is available and to enable the remote platform to verify integrity of the encrypted data, wherein the one least one message comprises an authentication tag calculated over a payload of the at least one message using a shared secret key. In Example 33, the subject matter of Example 32 can optionally include the apparatus further configured to perform the method of any one of the Examples 13 to 16.

Example 34 is at least one machine readable medium comprising a plurality of instructions that in response to being executed on a computing device, cause the computing device to carry out a method according to any one of Examples 12-16. Example 35 is an apparatus for facilitating protecting data transfer between a secure application and networked devices, configured to perform the method of any one of Examples 12-16. Example 36 is an apparatus for facilitating protecting data transfer between a secure application and networked devices, comprising means for performing the method of any one of claims 12 to 16. Specifics in the Examples may be used anywhere in one or more embodiments.

The foregoing description and drawings are to be regarded in an illustrative rather than a restrictive sense. Persons skilled in the art can understand that various modifications and changes may be made to the embodiments described herein without departing from the broader spirit and scope of the features set forth in the appended claims.

What is claimed is:

1. An apparatus comprising:
a source network interface controller (NIC); and
a processor to provide a trusted execution environment (TEE) to run an application, wherein the source NIC operates outside of a trust boundary of the TEE, and wherein the processor is to:
generate, via the application in the TEE, encrypted data of the application;
copy, via the application in the TEE, the encrypted data to a local shared buffer;
interface, using the application in the TEE, with the source NIC to initiate a copy, over a network, of the encrypted data from the local shared buffer to a remote buffer of a remote platform; and
communicate, via the application in the TEE, at least one message with the remote platform to indicate that the encrypted data is available and to enable the remote platform to verify integrity of the encrypted data, wherein the one least one message comprises an authentication tag calculated over a payload of the at least one message using a shared secret key.

2. The apparatus of claim 1, wherein the TEE further comprises a cryptographic engine communicably coupled to the application, the cryptographic engine to encrypt contents of unencrypted data generated by the application as the encrypted data.

3. The apparatus of claim 1, wherein the source NIC is a remote direct memory access (RDMA) NIC (RNIC) to perform data transfers with the remote platform using an RDMA protocol.

4. The apparatus of claim 1, wherein the processor is further to establish an integrity-protected channel with the remote platform via an attestation and a key exchange protocol, wherein the key exchange protocol is to cause the shared secret key to be derived with the remote platform, and wherein the at least one message is communicated to the remote platform via the integrity-protected channel.

5. The apparatus of claim 1, wherein the remote platform comprises a remote NIC that is trusted and can write directly to compute kernel memory of the remote platform.

6. The apparatus of claim 5, wherein the remote NIC can perform decryption and integrity verification of the encrypted data in-line as the remote NIC writes to the compute kernel memory of the remote platform.

7. The apparatus of claim 1, wherein the remote platform comprises a remote NIC that is untrusted and that writes the encrypted data into untrusted memory of the remote NIC.

8. The apparatus of claim 7, wherein the remote platform comprises a remote cryptographic engine to perform decryption and integrity verification of the encrypted data in the untrusted memory and cause decrypted and integrity verified data is written into compute kernel memory from the untrusted memory.

9. The apparatus of claim 1, wherein the authentication tag comprises a message authentication code (MAC) to provide integrity protection to the encrypted data.

10. The apparatus of claim 1, wherein the processor to generate, via the application in the TEE, the encrypted data of the application further comprises the processor to apply an encryption library to generate the encrypted data.

11. The apparatus of claim 1, wherein the processor comprises one or more of a graphics processing unit (GPU), a central processing unit (CPU), or a hardware accelerator, and wherein the remote platform comprises a hardware accelerator device receiving offload of workloads from the processor.

12. A method comprising:
generating, by a processor executing an application running in a trusted execution environment (TEE) of the processor, encrypted data of the application;
copying, by the processor using the application in the TEE, the encrypted data to a local shared buffer;
interfacing, by the processor using the application in the TEE, with a source network interface card (NIC) to initiate a copy, over a network, of the encrypted data from the local shared buffer to a remote buffer of a remote platform, wherein the source NIC operates outside of a trust boundary of the TEE; and
communicating, by the processor using the application in the TEE, at least one message with the remote platform to indicate that the encrypted data is available and to enable the remote platform to verify integrity of the encrypted data, wherein the one least one message comprises an authentication tag calculated over a payload of the at least one message using a shared secret key.

13. The method of claim 12, wherein the TEE further comprises a cryptographic engine communicably coupled to the application, the cryptographic engine to encrypt contents of unencrypted data generated by the application as the encrypted data.

14. The method of claim 12, further comprising establishing, via the application, an integrity-protected channel with the remote platform via an attestation and a key exchange protocol, wherein the key exchange protocol is to cause the shared secret key to be derived with the remote platform, and wherein the at least one message is communicated to the remote platform via the integrity-protected channel.

15. The method of claim 12, wherein the remote platform comprises a remote NIC that is trusted and can write to compute kernel memory directly, and wherein the remote NIC can perform decryption and integrity verification of the encrypted data in-line as the remote NIC writes to the compute kernel memory of the remote platform.

16. The method of claim 12, wherein the remote platform comprises a remote NIC that is untrusted and that writes the encrypted data into untrusted memory of the remote NIC, and wherein the remote platform comprises a remote cryptographic engine to perform decryption and integrity verification of the encrypted data in the untrusted memory and cause decrypted and integrity verified data is written into compute kernel memory from the untrusted memory.

17. A non-transitory machine readable storage medium having stored thereon executable computer program instructions that, when executed by one or more processors, cause the one or more processors to perform operations comprising:
    generating, by a processor executing an application running in a trusted execution environment (TEE) of the processor, encrypted data of the application;
    copying, by the processor using the application in the TEE, the encrypted data to a local shared buffer;
    interfacing, by the processor using the application in the TEE, with a source network interface card (NIC) to initiate a copy, over a network, of the encrypted data from the local shared buffer to a remote buffer of a remote platform, wherein the source NIC operates outside of a trust boundary of the TEE; and
    communicating, by the processor using the application in the TEE, at least one message with the remote platform to indicate that the encrypted data is available and to enable the remote platform to verify integrity of the encrypted data, wherein the one least one message comprises an authentication tag calculated over a payload of the at least one message using a shared secret key.

18. The non-transitory machine readable storage medium of claim 17, wherein the TEE further comprises a cryptographic engine communicably coupled to the application, the cryptographic engine to encrypt contents of unencrypted data generated by the application as the encrypted data.

19. The non-transitory machine readable storage medium of claim 17, wherein the one or more processors to perform further operations comprising establishing an integrity-protected channel with the remote platform via an attestation and a key exchange protocol, wherein the key exchange protocol is to cause the shared secret key to be derived with the remote platform, and wherein the at least one message is communicated to the remote platform via the integrity-protected channel.

20. The non-transitory machine readable storage medium of claim 17, wherein the remote platform comprises a remote NIC that is trusted and can write to compute kernel memory directly, and wherein the remote NIC can perform decryption and integrity verification of the encrypted data in-line as the remote NIC writes to the compute kernel memory of the remote platform.

* * * * *

UNITED STATES PATENT AND TRADEMARK OFFICE
CERTIFICATE OF CORRECTION

| | | |
|---|---|---|
| PATENT NO. | : 11,784,990 B2 | Page 1 of 1 |
| APPLICATION NO. | : 17/549014 | |
| DATED | : October 10, 2023 | |
| INVENTOR(S) | : Reshma Lal and Luis Kida | |

It is certified that error appears in the above-identified patent and that said Letters Patent is hereby corrected as shown below:

In the Claims

In Claim 1, Column 49, Line 60, and Claim 12, Column 50, Line 57, and Claim 17, Column 52, Line 8, each occurrence should read "wherein the at least one message".

Signed and Sealed this
Thirteenth Day of February, 2024

Katherine Kelly Vidal
*Director of the United States Patent and Trademark Office*